March 27, 1962     W. R. HUNSICKER ETAL     3,027,556
APPARATUS FOR INDICATING LOSS OF LANE COUNT
IN HYPERBOLIC POSITION FINDING SYSTEMS
Filed Dec. 5, 1960            3 Sheets-Sheet 2

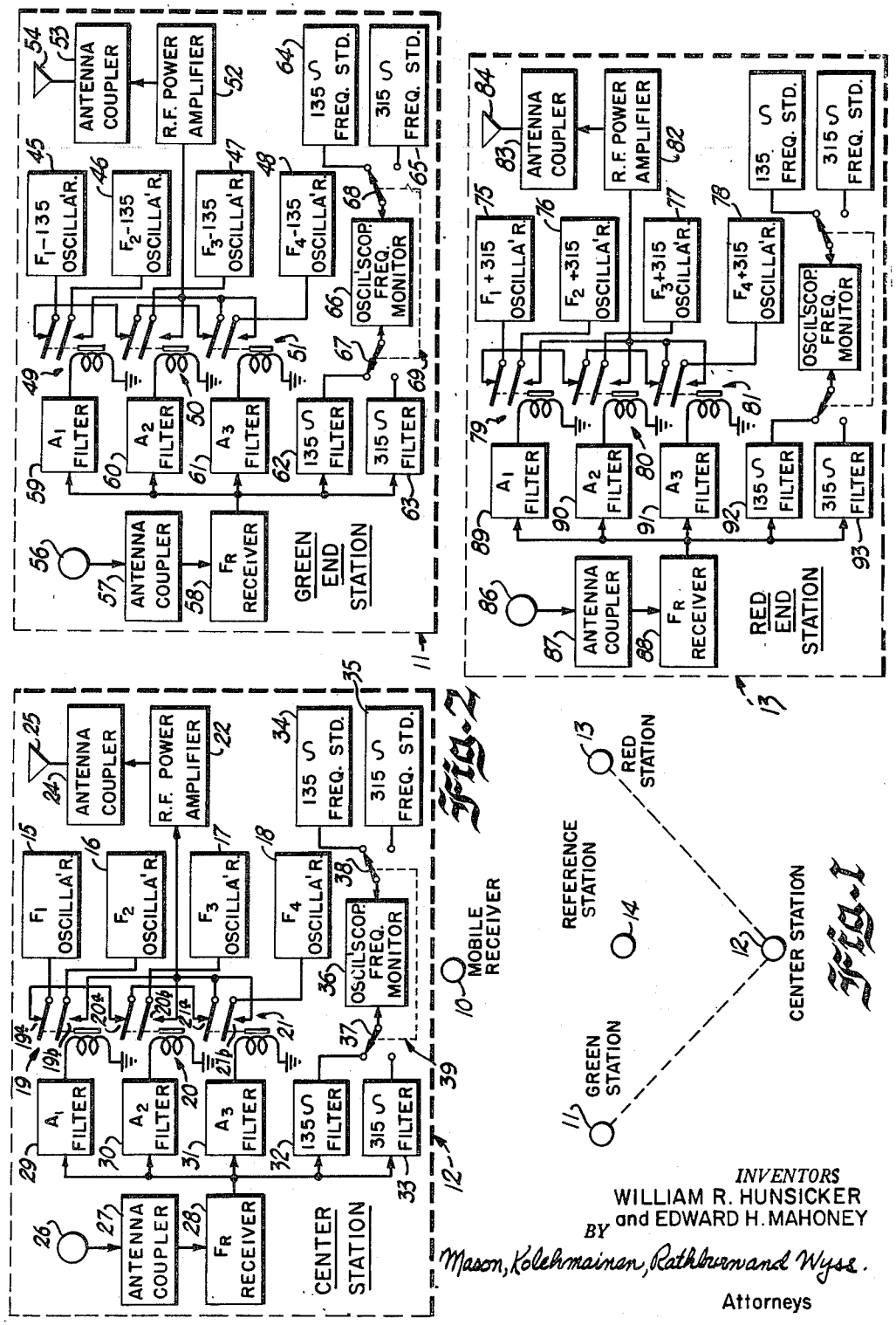

*Fig. 3*

INVENTORS
WILLIAM R. HUNSICKER and
BY EDWARD H. MAHONEY
Mason, Kolehmainen, Rathburn and Wyss
Attorneys

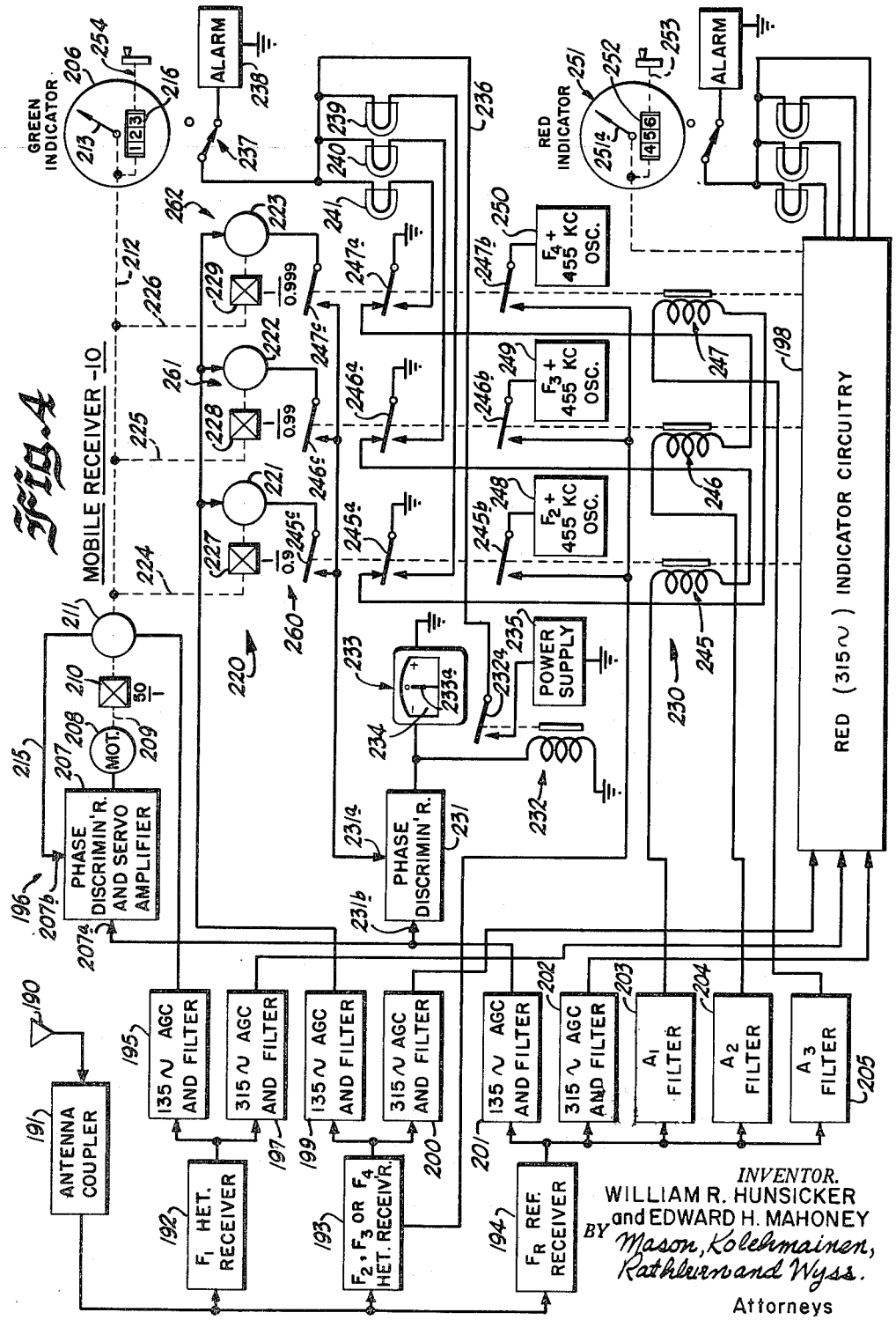

3,027,556
APPARATUS FOR INDICATING LOSS OF LANE COUNT IN HYPERBOLIC POSITION FINDING SYSTEMS

William R. Hunsicker and Edward H. Mahoney, Tulsa, Okla., assignors to Seismograph Service Corporation, Tulsa, Okla., a corporation of Delaware
Filed Dec. 5, 1960, Ser. No. 73,888
20 Claims. (Cl. 343—105)

The present invention relates generally to radio position determining systems and is more particularly concerned with improvements in radio position finding systems of the hyperbolic continuous wave type employing phase comparison in pairs of position indicating signals radiated from a plurality of spaced transmitting points to provide one or more indications from which the position of a mobile receiving point relative to the known locations of the transmitters may be determined very accurately. The invention is particularly concerned with a new and improved system of the above type including apparatus for retrieving lane identification which may be lost as a result of system failures in the receiving or transmitting equipment or by weak signal areas caused by local conditions adversely affecting radio wave propagation.

In systems of the particular type referred to, the continuous waves radiated from each pair of transmitters bear a phase relationship at the mobile receiving unit which changes as a function of the changing position of the latter unit relative to the transmitting points. More specifically, the waves radiated by each pair of transmitting units of the system are characterized by isophase lines which are hyperbolic in contour about the transmitting points as foci. With this system arrangement, the position of a receiving point relative to a pair of hyperbolic isophase lines may be determined by measuring the phase relationship between waves radiated from the pairs of transmitters. Since the point of location of the receiving point along the zone separating the two isophase lines is not indicated by such a phase measurement, it is desirable to employ at least three spaced transmitters, different pairs of which function to provide a grid-like pattern of intersecting hyperbolic isophase lines in order to obtain a position fix providing an absolute determination of the position of the receiving point.

In Honore Patent No. 2,148,267 a system is disclosed in which the waves radiated from each pair of transmitters are heterodyned at a fixed linked transmitting point and the difference frequency between the heterodyned waves is modulated as a reference signal on the carrier wave output of the link transmitter for radiation to the receiving point where the difference frequency component is detected and phase compared with the difference frequency signal derived by directly heterodyning the transmitted continuous waves arriving at the receiving point from the pair of transmitters. In this manner any phase shifts between the continuous waves radiated from the two transmitters are completely compensated so that the measured phase angle is truly representative of the location of the receiving point between the pair of isophase lines. In Hawkins Patent No. 2,513,316 an improved system is disclosed wherein a single reference transmitter is employed as a link transmitter for radiating all of the reference signals to the mobile receiving point, thereby reducing the number of signal channels required as well as the amount of equipment necessary to provide a complete system.

A particular problem encountered in the operation of continuous wave systems of the type disclosed in the Honore and Hawkins patents is that of eliminating ambiguity from the phase measurements which provide the desired position information. Thus, while the two phase measurements identify the position of the receiving station relative to two intersecting pairs of hyperbolic isophase lines, they do not identify the particular pair of lines to which the indications are related. This means that in operating the system, the geographic location of the receiving point must be known at the start of movement of the receiver relative to the transmitting stations and furthermore that the successive wavelengths or lanes traversed must be counted as the receiving station is moved relative to the grid-like pattern of hyperbolic lines. It also means that a mobile craft entering the radiation pattern of the transmitters cannot utilize the radiated signals to determine its position without employing auxiliary equipment to determine the approximate position of the craft relative to the signal transmitters.

One means employed heretofore for identifying the lanes or grids has been to provide an integrating counter mechanism which adds or subtracts a digit when the phase indicator undergoes a change of 360 degrees. Since a lane is crossed whenever such a 360 degree change occurs, the lanes are continuously identified by the integrating counter while the phase indicator provides information concerning the precise position of the multiple receiver within the lane identified. A system of this type, however, requires continuous uninterrupted operation of the transmitting and receiving facilities since even relatively short periods of interrupted operation may result in the loss of one or more counts on the integrating counters if the mobile receiving unit moves during the period of interruption. Such interruptions might be caused by failure of the indicating, receiving or transmitting equipment for short periods of time or, in the alternative, by the presence of a weak signal area in the field pattern of the transmitting system. The presence of a weak signal area, which might be caused by local conditions adversely affecting radio wave propagation, renders the receiver insensitive to phase changes and, hence, the mobile unit may pass through a lane without at the same time adding or subtracting a digit from the counting mechanism. As soon as the signal strength returns to normal or when the system is restored to normal operation the phase indicator again provides accurate information concerning the location of the mobile craft but the integrating counters have, in the meantime, failed to record the lane change and as a result the actual position of the receiver cannot be determined. It would, of course, be desirable to provide a system which operates automatically at the completion of the interruption period to indicate that the lane count is incorrect so that the integrating counters may be set to provide an accurate lane count and the satisfaction of this desire therefore constitutes one of the principal objects of the present invention.

A further object of the present invention is to provide a new and improved apparatus for retrieving lost lanes in a hyperbolic continuous wave radio position finding system.

Another object of the present invention is to provide a new and improved transmitting system for use in radio position finding systems of the type described above.

The invention has for a further object the provision of new and improved mobile receiving equipment for use in radio position finding systems of the type described above and including apparatus operative automatically at the termination of any interruption in the normal operation of the system to indicate that the integrating counters have lost the lane count so that they may be manually reset.

It is a further object of the present invention to provide a system of the character described above wherein the indication provided informs the operator that the lane count is incorrect and also indicates the direction of the error so that the operator is apprised of the direction in which the counters must be set in order to restore the proper lane count.

The invention, both as to its organization and manner of operation, together with further objects and advantages will best be understood by reference to the following description taken in conjunction with the accompanying drawings wherein:

FIG. 1 is a schematic diagram showing a typical arrangement of the transmitters of a three foci transmitting system characterized by the features of the present invention together with a mobile receiving unit whose position is to be determined;

FIG. 2 diagrammatically illustrates the equipment employed at the two end transmitting stations and at the center station of the transmitting system;

FIG. 3 diagrammatically illustrates the equipment employed at the reference station of the transmitting system; and FIG. 4 is a diagrammatic representation of a mobile receiving unit for use with the transmitting system shown in FIGS. 1 to 3 to provide a determination of the position of a mobile craft operating within the field pattern of the transmitting system.

Referring now to the drawings and more particularly to FIG. 1 thereof, the invention is there illustrated as embodied in a three foci hyperbolic, continuous wave system for providing position information at any number of mobile receiving units 10 (FIG. 4) which may be carried on vessels or vehicles operating within the transmission field of a plurality of spaced apart transmitters or transmitting units 11, 12, 13 and 14. The transmitters 11, 12 and 13 are preferably spaced apart approximately equal distances and are so positioned that an imaginary base line joining the points of location of the units 11 and 12 is angularly related to a similar base line joining the points of location of the units 12 and 13. As a consequence, the transmitter or transmitting unit 12 may be considered to be the center transmitter while the transmitting units 11 and 13 may be referred to as the end transmitters with these units, for convenience, being respectively referred to as the Green end station and the Red end station in ensuing portions of this description. The transmitting unit 14 is spaced from all three of the units 11, 12 and 13 and, since its function is to receive the signals radiated from the latter stations and to develop therefrom reference signals for radiation as modulation components, it is designated as the reference station. More specifically, the equipment provided at each of the transmitting stations 11, 12 and 13 is effective to radiate a first position indicating signal which is periodically interrupted for a predetermined period to permit the radiation in sequence of three different ambiguity resolution signals. The three position indicating signals radiated from the stations 11, 12 and 13 fall within a first frequency channel, which, for convenience, will be designated as the $F_1$ channel, while the three different ambiguity resolution signals fall within three different frequency channels, respectively designated as the $F_2$, $F_3$ and $F_4$ channels, with each of the latter channels including one of the ambiguity resolution signals from each of the three stations.

The reference station 14 is equipped to receive all of the signals radiated from the transmitting stations 11, 12 and 13 and to heterodyne these signals in pairs in order to develop reference signals for radiation as modulation components upon a carrier wave emitted from the reference station. The latter carrier wave lies within a frequency channel, designated as the $F_R$ channel, which is different from the $F_1$ channel of the position indicating signals and also from the three channels $F_2$, $F_3$ and $F_4$ occupied by the ambiguity resolution signals. The carrier wave emitted from the reference station is also adapted during each of the predetermined periods referred to above to be modulated in sequence by three different audio frequency switching signals $A_1$, $A_2$ and $A_3$ which are effective at the stations 11, 12 and 13 to interrupt the radiation of the position indicating signal and instead to render the station effective to radiate the ambiguity resolution signals.

The mobile receiver 10 is equipped to receive all of the position indicating and ambiguity resolution signals as well as the reference station carrier wave with its modulating reference signals and switching signals. The mobile receiver responds to the received signals by providing a first position indication representing the location of the mobile craft relative to a first family of hyperbolic, isophase lines having foci at the transmitting stations 11 and 12 and by providing a second position indication representing the location of the mobile craft relative to a second family of hyperbolic, isophase lines having foci at the transmitting stations 12 and 13. The mobile receiver 10 is also equipped to count the lanes of the two families of isophase lines traversed by the mobile craft and during the period when the ambiguity resolution signals are being received this receiver is effective to provide automatically an indication that either or both of the lane counts are inaccurate in the event that the lane count has been lost. Thus, the operator is informed that the counters must be reset in order to restore the proper lane count.

Briefly considered, the equipment provided at the center transmitting station 12 comprises four different oscillators or wave signal generators 15, 16, 17 and 18 which are respectively adapted to develop signals having different frequencies. Since the particular frequencies used in the system are unimportant, letter designations have been employed throughout with the signals from the generators 15, 16, 17 and 18 being respectively designated as $F_1$, $F_2$, $F_3$ and $F_4$. The outputs from the four oscillators are supplied through the contacts of three different switching relays 19, 20 and 21 to a conventional radio frequency power amplifier circuit 22. The latter circuit supplies its output signals through an antenna coupler 24 for emission from a radiating antenna 25. The three relays 19, 20 and 21 are effective to connect the output of the oscillators one at a time to the input of the power amplifier 22. Thus, with all of the relays deenergized so that their movable arms of poles occupy the positions shown in FIG. 2, the output of the oscillator 15 is supplied through the sets of contacts 19a, 20a and 21a to the power amplifier. The three relays 19, 20 and 21 are respectively energized by the audio signals $A_1$, $A_2$ and $A_3$ modulated upon the carrier wave received from the reference station 14. To this end, the equipment provided at the center station 12 includes a receiving antenna 26 connected through an antenna coupler 27 to a conventional superheterodyne receiver 28 which is tuned to receive the carrier wave $F_R$ radiated from the reference station. The receiver 28 reproduces both the reference signals and the tone switching signals $A_1$, $A_2$ or $A_3$ modulated upon the latter carrier wave and supplies all of these signals to a set of bandpass filters 29, 30, 31, 32 and 33. The filters 29, 30 and 31 are designed respectively to pass the three different tone switching signals $A_1$, $A_2$ and $A_3$ while the filters 32 and 33 are designed to pass the two different reference signals. Thus, when the first tone switching signal $A_1$ is modulated upon the carrier wave radiated from the reference station 14, this signal is detected by the receiver 28 and is passed through the filter 29 to energize the relay 19. When the relay 19 is energized, the contacts 19a are broken so that the oscillator 15 is no longer connected to the power amplifier 22. At the same time, energization of the relay 19 closes the contacts 19b to supply the output of the oscillator 16 to the input of the power amplifier 22. Thus, when the tone switching signal $A_1$ is modulated upon the carrier wave radiated from the reference station 14, the center station 12 is rendered effective to radiate an ambiguity resolution signal having a frequency $F_2$.

Similarly, when the tone switching signal $A_2$ is modulated upon the carrier wave radiated from the reference station 14, the relay 20 is energized with the result that its contacts 20a are broken to disconnect the output of the oscillator 15 from the input of the power amplifier 22 while its contacts 20b are closed to supply signals from the oscillator $F_3$ to the power amplifier. Thus, during the period when the carrier wave radiated from the reference station 14 is modulated by the tone switching signal $A_2$, the center station 12 is rendered effective to radiate an ambiguity resolution signal having a frequency $F_3$.

During the period when the carrier wave radiated from the reference station 14 is modulated with the tone switching signal $A_3$, the relay 21 is energized so that its contacts 21a are broken to interrupt the circuit from the oscillator 15 while, at the same time, its contacts 21b are closed to connect the output of the oscillator $F_4$ to the input of the power amplifier 22. Thus, during the interval when the carrier wave from the reference station 14 is modulated with the tone switching signal $A_3$, the center station 12 is effective to radiate an ambiguity resolution signal having a frequency $F_4$.

To permit the operation of the transmitting system to be monitored at the center station 12, the equipment provided at the center station 12 further includes a pair of standard frequency oscillators 34 and 35 and an oscilloscope type frequency monitor 36. The oscilloscope monitor receives its input signals through two different sections 37 and 38 of a ganged two section switch 39. The oscilloscope functions in a manner described more fully below to provide a Lissajous pattern or figure by comparing the output of one of the standard oscillators 34 or 35 with a reference signal of the same frequency passed by the filters 32 or 33. The particular pair of signals compared by the monitor is, of course, determined by the position of the switch 39.

The equipment provided at the Green end station 11 is identical to that at the center station 12 except for the frequencies of the oscillators or wave signal generators. Thus, the Green end station is provided with four oscillators 45, 46, 47 and 48 each of which develops an output signal having a frequency 135 cycles less than that developed by the corresponding oscillator at the center station 12 and, hence, these signals are designated as $F_1-135$, $F_2-135$, $F_3-135$ and $F_4-135$. Here again, the outputs of these four oscillators are supplied through three relays 49, 50 and 51 to an RF power amplifier 52 which has its output signals supplied through an antenna coupler 53 for radiation from an emitting antenna 54. To supply tone switching signals for operating the relays 49, 50 and 51, the Green end station further includes a receiving antenna 56 coupled through an antenna coupler 57 to a conventional superheterodyne receiver 58. The latter receiver is again tuned to accept the carrier wave radiated from the reference station 14 and is sufficiently selective to reject the signals falling within the position indicating channel $F_1$ and also those falling within the three channels $F_2$, $F_3$ and $F_4$ occupied by the ambiguity resolution signals. The output of the receiver 58 is supplied to bandpass filters 59, 60, 61, 62 and 63. The manner in which the tone switching signals $A_1$, $A_2$ and $A_3$ passed by the filters 59, 60 and 61 control the operation of the relays 49, 50 and 51 will be obvious in view of the foregoing description. The Green end station may also be provided with equipment for monitoring the operation of the transmitters although this is optional since the monitoring may be performed exclusively at the center station 12 if desired. In any event, if monitoring equipment is desired at the Green end station, an oscilloscope type monitor 66 and a pair of standard frequency generators 64 and 65 are provided with the input to the horizontal and vertical deflection circuits of the oscilloscope being supplied through the two sections 67 and 68 of a ganged, manually operated switch 69.

The equipment provided at the Red end station 13 is identical to that provided at the Green end station 11 and at the center station 12 except for the operating frequencies of the four oscillators. Thus, the equipment at the Red end station 13 includes four oscillators 75, 76, 77 and 78 for developing signals which are respectively indicated at $F_1+315$, $F_2+315$, $F_3+315$ and $F_4+315$ since each of these signals is 315 cycles higher in frequency than the signal developed by the corresponding oscillator 15, 16, 17 or 18 at the center station. The oscillators 75, 76, 77 and 78 are connected one at a time through relays 79, 80 and 81 to a power amplifier 82 in a manner which will be obvious in view of the foregoing description. The output from the power amplifier 82 is supplied through an antenna coupler circuit 83 to an emitting or radiating antenna 84. To provide signals for controlling the operation of the relays 79, 80 and 81, the Red end station includes a receiving antenna 86 connected through an antenna coupler 87 to a coventional superheterodyne receiver 88. The latter receiver is tuned to accept the carrier wave $F_R$ radiated from the reference station 14 and to reject the remaining signals in the different frequency channels of the transmitting system. The output from the receiver 88 comprising the detected modulation components appearing on the carrier wave $F_R$ is supplied to a set of bandpass filters 89, 90, 91, 92 and 93. The switching signals $A_1$, $A_2$ and $A_3$ passed by the filters 89, 90 and 91 respectively control the operation of the relays 79, 80 and 81 in a manner which will be apparent from the foregoing description. Here again, suitable monitoring equipment may be provided at the Red end station if desired.

In view of the foregoing description it will be recognized that the three signals developed by the oscillators 15, 45 and 75 fall within the $F_1$ or position indicating frequency channel. All three of these signals are radiated simultaneously throughout the period when the carrier wave from reference station 14 is not modulated with any of the tone switching signals $A_1$, $A_2$ or $A_3$. The signals developed by the oscillators 16, 46 and 76 fall within the $F_2$ ambiguity resolution signal channel and are radiated simultaneously from the three stations 11, 12 and 13 whenever the carrier wave from the reference station 14 is modulated with the tone switching signal $A_1$. Similarly, the signals developed by the oscillators 17, 47 and 77 fall within the $F_3$ ambiguity resolution channel and are simultaneously radiated from the three stations 11, 12 and 13 whenever the carrier wave $F_R$ is modulated with the switching signal $A_2$. Finally, the signals developed by the oscillators 18, 48 and 78 fall within the $F_4$ ambiguity resolution channel and are simultaneously radiated from the three stations 11, 12 and 13 whenever the carrier wave $F_R$ is modulated with the switching signal $A_3$. To provide effective ambiguity resolution using equipment having the usual tolerances or errors, the frequencies of the four channels are preferably selected so that:

$$F_1-F_2=.1F_1$$
$$F_1-F_3=.01F_1$$
$$F_1-F_4=.001F_1$$

Considering next the equipment provided at the reference station 14 and referring particularly to FIG. 3 of the drawings, it will be observed that this equipment includes an oscillator 100 for developing a carrier wave signal having a frequency $F_R$ which as was indicated above lies in a frequency channel differing from the other four channels $F_1$, $F_2$, $F_3$ and $F_4$. The output of the oscillator 100 is applied to an RF power amplifier 101 which has its output signals supplied through an antenna coupler circuit 102 to an emitting or radiating antenna 103. As was previously indicated, the carrier wave developed by the oscillator 100 is adapted to be modulated with reference signals derived from heterodyning the signals received from the stations 11, 12 and 13 and with tone switching signals $A_1$, $A_2$ and $A_3$ developed at the reference station 14. To develop the reference signals, the reference station 14 includes a conventional superheterodyne receiver 104 having an external local oscillator circuit to be described more fully hereinafter. The input or RF section of the receiver 104 receives signals from a receiving antenna 105 through an antenna coupler circuit 106. This RF section is broadly tuned so as to accept all of the signals in the $F_1$, $F_2$, $F_3$ and $F_4$ frequency channels. The receiver and its local oscillator circuit are effective to heterodyne in pairs the three signals of each channel accepted to develop the audio frequency differences or beats therebetween. Thus, irrespective of which of the four frequency channels is being received, the receiver produces an output consisting of 135, 315 and 450 cycle difference frequency signals. These three difference frequency signals are supplied to a pair of bandpass filters 107 and 108 respectively tuned to pass the 135 cycle and 315 cycle signals. The 450 cycle signal is, of course, rejected by both of the filters 107 and 108 and, hence, has no effect. The two difference signals passed by the filters 107 and 108 are applied to a linear audio mixer circuit 109 which combines these signals linearly and without heterodyning them. The mixer has its output connected to a modulater 110 which is effective to amplitude modulate the carrier wave signal $F_R$ developed by the oscillator 100 with the 135 and 315 cycle reference signals.

The tone switching signals $A_1$, $A_2$ and $A_3$ are developed by oscillators 111, 112 and 113, respectively, and are supplied to the audio mixer 109 through a switching arrangement indicated generally by the reference numeral 114. The latter switching arrangement may be rendered effective through manually operated switches 115 and 116 to supply any one of the tone signals continuously to the mixer or, in the alternative, to disconnect the mixer from all of the tone signal oscillators 111, 112 and 113. Generally, such a condition is used only during testing of the system or for other similar purposes since the switching arrangement 114 includes a motor driven selector switch 117 which, under normal operating conditions, is effective for a small portion of the cycle to pass the outputs of the oscillators 111, 112 and 113. The signals from each oscillator are supplied to the mixer through a second motor driven keying switch 118 which is operated continuously and which is effective to alternately make and break the circuit to the mixer. During the major portion of the cycle, the switch 117 is conditioned to route the output of the oscillator 111 to the switch 118 and the latter switch keys or alternately interrupts the switching signal $A_1$ with the result that pulses or bursts of the tone signal $A_1$ are passed to the mixer 109. Under these conditions the carrier wave $F_R$ is modulated with the keyed pulses. During a considerably shorter period of the cycle, the switch 117 is conditioned to pass the switching signals $A_1$, $A_2$ and $A_3$ in sequence with the switch 118 again being effective to develop a keyed or pulsed output.

Considering next the details of the switching arrangement 114 to perform the functions enumerated above, it will be observed that the manually operated switch 116 consists of two switch sections 119 and 120 having their movable arms or poles 119a and 120a ganged together for simultaneous operation. The switch sections 119 and 120 may be conditioned for automatic operation to permit the supply of signals from the oscillators 111, 112 and 113 under the control of the motor driven switches 117 and 118. To effect such automatic operation, the movable poles 119a and 120a are moved to the positions shown in FIG. 3 wherein they respectively engage fixed contacts 121 and 122. The poles of the switch 116 are also movable to four different "Manual" positions in one of which all of the oscillators are disconnected from the keying switch 118 while in the other three positions the motor driven switch 117 is bypassed in order to respectively supply signals from the oscillators 111, 112 and 113. More specifically, when the movable poles 119a and 120a are in respective engagement with fixed contacts 123 and 124, the switch section 120 is conditioned to pass the tone switching signal $A_3$ developed by the oscillator 112 directly to the switch 118 and irrespective of the position of the motor driven switch 117. In similar manner when the movable poles 119a and 120a engage the fixed contacts 125 and 126, respectively, the switch section 120 passes the tone switching signal $A_2$ independently of the operation of the motor driven switch 117. In the same manner, when the movable poles 119a and 120a engage the switch contacts 127 and 128, the tone switching signal $A_1$ is supplied through the switch section 120 independently of the operation of the motor driven switch 117. The manually operated switch 116 includes a further position, namely, that established when the movable poles 119a and 120a engage the fixed contacts 129 and 130, wherein all of the signals generated by the oscillators 111, 112 and 113 are prevented from reaching the keying switch 118.

The manually operated switch 115 includes two switch sections 131 and 132 having movable poles or arms 131a and 132a joined together for simultaneous movement. The movable poles may be moved either to a "test" position as shown in FIG. 3 wherein they bypass both sections of the motor driven keying switch 118 or to a "normal" position wherein the motor driven keying switch 118 is effective to alternately interrupt the delivery of signals to the audio mixer 109.

The motor driven keying switch 118 also includes a pair of switch sections 133 and 134 having rotatable wipers 133a and 134a ganged together and continuously driven by a suitable motor 135 through a mechanical connection indicated by the broken line 136. The wipers are driven at any suitable rate, for example, at a rate of 120 revolutions per minute. Each of these wipers engages or wipes a commutating ring comprising a pair of electrically conducting, arcuately shaped, stator segments with the segments of the section 133 being identified by reference numerals 137 and 138 and with those of the section 134 bearing reference numbers 139 and 140. Each of the latter segments extends around the ring slightly less than 180 degrees and the two segments are separated by insulating areas as indicated at 141 and 142 for the section 133. The signals supplied from the selector switch 116 are passed by the switch section 134 only during the period when the wiper arm 134a engages the segment 139. During the portion of the cycle when the wiper 134a engages the segment 140 and during those periods when the wiper 134a engages the insulating sections of the commutating ring, no signals are passed by the switch section 134 to the audio mixer 109.

The motor driven switch 117 also includes two switch sections 145 and 146 having wiper arms 145a and 146a joined together for rotation by a drive motor 147 through a mechanical drive indicated generally by the broken line 148. The wiper arms 145a and 146a engage commutating rings 149 and 150, respectively, which are similar to the commutating rings employed in the keying switch 118 except that they include three conducting segments instead of two. More specifically, the ring 149 comprises three conducting stator segments 151, 152 and 153 each of which encompasses slightly less than 120 degrees of the ring with the three segments being separated or electrically isolated by insulating regions 154, 155 and 156. The commutating ring 150 includes conducting segments 157, 158 and 159 electrically insulated from each other by insulating regions 160, 161 and 162. As was indicated previously, the switch section 146 is effective during a small portion of the operating cycle to supply the outputs of the oscillators 111, 112 and 113 in sequence through the selector switch section 120 to the motor driven keying switch 118. To this end, the output circuit of the oscillator 111 is connected to the conducting segment 157, the output of the oscillator 112 is connected to the conducting segment 159 and the output of the oscillator 113 is connected to the conducting segment 158.

The switch section 145 is adapted to select the proper local oscillator signal for application to the receiver 104. More specifically, during the period when the three transmitting stations 11, 12 and 13 are radiating signals in the $F_1$ channel, the receiving equipment at the reference station must be supplied with a local oscillator signal of proper frequency to heterodyne with the incoming signals to develop the desired intermediate frequency which, as is customary in superheterodyne receivers, is preferably 455 kilocycles. To permit use of the same RF and IF strips in the reference station receiving equipment irrespective of the frequency channel being received, it is apparent that the local oscillator frequency must be changed during those periods when the three stations 11, 12 and 13 are radiating signals in the $F_2$, $F_3$ and $F_4$ ambiguity resolution channels. To this end, the receiving equipment at the reference station includes four external local oscillator circuits 165, 166, 167 and 168 respectively developing local oscillator signals having frequencies of $F_1+455$ kilocycles, $F_2+455$ kilocycles, $F_4+455$ kilocycles and $F_3+455$ kilocycles. During the period when none of the tone switching signals appears on the carrier wave $F_R$, the three stations 11, 12 and 13 are radiating signals in the $F_1$ channel and, hence, the output of the oscillator 165 is supplied to the receiver 104 during this period of operation. To this end, the output of the oscillator 165 is connected directly to the conducting segment 138 of the commutating ring employed in the switch section 133. Thus, when the wiper arm 133a engages the conducting segment 138, the receiver 104 is excited by the local oscillator signal developed by the oscillator 165. When the wiper arm 133a engages the conducting segment 137, the signal supplied to the receiver 104 will be that supplied from the switch section 145 through the selector switch 116.

The timing for the switching arrangement 114 is controlled by a continuously driven motor 170 and its associated cam mechanism 171. The cam 171 is driven very slowly through a drive mechanism 170a including a step down or reduction gearing so that once every 30 minutes, the cam 171 reaches a position where a dwell or reduced portion 171a in its periphery registers with a cam follower 173 riding upon the cam periphery. In the dwell or "On" position shown in FIG. 3, the follower 173 engages a fixed switch contact 174 to complete a circuit from one side 147a of the motor 147 through a conductor 176 to one terminal of an A.C. source not shown in the drawings but indicated by the plug 175. The other side of the source is connected at all times through conductor 177 to the second side 147b of the motor 147. Thus, as soon as the cam follower 173 engages the switch contact 174 the circuit to the drive motor 147 is completed. The output of the motor 147, as was indicated previously, drives the switch 117 and, in addition, is connected to a five to one step down gearing 178 to drive a cam 179. The latter cam and its associated follower 180 are effective to maintain the motor 147 energized until the latter motor has completed five revolutions. Due to the five to one step down ratio of the gearing 178, the cam 179 is turned through one complete revolution only when the motor output shaft has been rotated through five complete revolutions. When the cam 179 is turned from the "Off" position shown in FIG. 3 wherein its associated follower 180 is seated within a dwell or reduced area of the cam, the follower is raised along the periphery of the cam until it engages a fixed contact 181 to complete a holding circuit to the conductor 176 in parallel with that effected by the cam follower 173 and the fixed contact 174. Thus, the cam 179 and its associated follower 180 will maintain the motor 147 energized even after the cam 171 has been turned to raise the cam follower 173 out of engagement with the fixed contact 174. The motor 147 then remains energized until it completes five revolutions to bring the cam 179 to its "Off" position to break the holding circuit for the motor.

Turning now to the operation of the transmitting system referred to above with the manual selector switch 116 in the "Automatic" position and with the manually operated switch 115 in its "Normal" position, it will be observed that for the first 25 minutes of the cycle, the motor 147 is not energized. The "Off" position of the cam 179, that is, the position where the follower 180 is seated within the dwell portion 179a of the cam 179 is such that the wiper arms 145a and 146a are in engagement with the conducting segments 151 and 157 respectively. This "Off" position of the cam 179 and the follower 180 is maintained throughout the first 25 minutes of the cycle and, as a consequence, throughout this entire period, the signal output from the oscillator 111 is supplied through the switch section 120 to the conducting segment 139 while, at the same time, the signal output from the oscillator 166 is supplied by the switch section 145 to the conducting segment 137. Since the motor 135 is driven continuously, the wipers 133a and 134a alternately engage their conducting segments throughout the first 25 minutes of the cycle. Since these wipers are driven at a rate of two revolutions per second, it will be apparent that one-half second pulses of the tone switching signal $A_1$ are supplied to the modulator 110. During each of the one-half second periods when the modulator is supplied with the switching signal $A_1$, the three transmitters 11, 12 and 13 are rendered effective to radiate signals in the $F_2$ ambiguity resolution channel. These three signals are accepted by the receiver 104 which, at this time, is excited by the proper local oscillator signal having a frequency of $F_2+455$ kilocycles since, during each such one-half second period, the wiper 133a engages the segment 137 to supply the output of the oscillator 166 to the receiver 104. The latter receiver functions in conventional manner to heterodyne the signal received from the center transmitting station 12 with that received from the Green end station 11 to develop a 135 cycle difference frequency signal. At the same time, the signal received from the Red end station 13 is heterodyned with the signal received from the center station to develop a 315 cycle difference signal. The 450 cycle difference signal between the radio frequency waves received from the two end stations 11 and 13 is also developed but, since it is rejected by both of the filters 107 and 108, it has no effect upon the operation of the equipment at the reference station 14. The 135 cycle difference frequency signal is, of course, passed by the filter 107 to the mixer 109 while the 315 cycle difference signal is passed by the filter 108. These two signals are supplied to the modulator 110 for amplitude modulation upon the carrier wave $F_R$ in order to provide reference signals at the mobile receiving unit 10 in a manner which will be evident to those skilled in this art and particularly to those familiar with the operation of the system disclosed in Honore Patent No. 2,148,267.

During the half second periods when the wiper arms 133a and 134a of the keying switch 118 are in engagement with the conducting segments 138 and 140, respectively, the carrier wave $F_R$ is not modulated with a tone switching signal and, as a consequence, all three of the transmitting stations 11, 12 and 13 are rendered effective to radiate position indicating signals in the $F_1$ channel. During these half second periods, the switch section 133 is effective to supply the receiver 104 with the proper local oscillator signal of frequency $F_1+455$ kilocycles developed by the oscillator circuit 165. The receiver 104 heterodynes the three signals of the $F_1$ channel arriving from the stations 11, 12 and 13 to develop the beat frequencies or differences therebetween. The 135 cycle difference frequency signal developed as a result of heterodyning the two signals received from the stations 11 and 12 is passed through the filter 107 to the mixer 109. The 315 cycle difference frequency or beat signal developed as a result of heterodyning the two signals arriving from the stations 12 and 13 is passed through the filter 108 to the mixer circuit 109. Thus, during each of the half second intervals when the carrier wave $F_R$ is not modulated with one of the tone switching signals, the two beat signals of 135 cycles and 315 cycles developed from heterodyning the signals of the $F_1$ channel are applied as modulation components upon the carrier wave $F_R$. Here again, these modulation components serve as reference signals for use at the mobile receiving unit to provide a position indication in the manner described more fully below.

At the end of the 25 minute period just described, the cam 171 has been rotated to a position where the cam follower 173 enters the dwell portion 171a and engages the fixed contact 174. The motor 147 is thus energized for the next five minutes of the cycle while its output shaft turns through five complete revolutions to drive the wipers of the switch 117. When the wipers 145a and 146a engage the fixed segments 152 and 158, the output from the oscillator 113 is supplied to the keying switch 118 while, at the same time, the output of the oscillator 168 is supplied to the conducting segment 137 of the keying switch section 133. Thus, for a period of 20 seconds while the wiper arms 145a and 146a move over the segments 152 and 158, the modulator 110 is supplied with keyed or pulsed tone switching signals $A_2$ from the oscillator 113. Here again, the pulses occur for one-half second intervals and during each interval when the carrier wave $F_R$ is modulated with the tone switching signal $A_2$ the three transmitting stations 11, 12 and 13 are effective to radiate ambiguity resolution signals in the $F_3$ channel. These three signals are received at the reference station where the receiver 104 is provided with a local oscillator signal from the oscillator 168 of proper frequency to develop the desired beat or heterodyne signal of 135 cycles and 315 cycles in the manner which will be obvious in view of the foregoing description. The latter beat signals are, of course, modulated upon the carrier wave $F_R$ simultaneously with the tone switching signal $A_2$ during each of the one-half second intervals when the latter tone switching signal is supplied to the modulator 110. During each of the one-half second periods between the latter intervals the tone switching signal $A_2$ is interrupted and the transmitting stations 11, 12 and 13 revert to the condition where they radiate signals in the $F_1$ channel, with all of the results previously described. At the end of the first 20 second period, the wipers 145a and 146a move into engagement with the segments 153 and 159 and, hence, during the succeeding 20 seconds, the modulator 110 receives pulses or bursts of signals developed by the oscillator 112. The operation of the transmitting system during this 20 second period is believed to be obvious in view of the foregoing description. This operation continues for five complete revolutions of the wipers 145a and 146a and at the expiration of the fifth revolution, the cam 179 reaches a position where the cam follower 180 falls into the dwell portion 179a and breaks its engagement with the fixed contact 181 thus interrupting the drive to the motor 147 at a position to begin the next 30 minute cycle.

The 135 cycle and 315 cycle reference signals modulated upon the carrier wave $F_R$ during all of the described intervals are detected by each of the receivers at the stations 11, 12 and 13. These detected reference signals may be compared by the frequency monitoring equipment at each station with the highly stable, standard 135 cycle and 315 cycle signals. If the frequencies of the detected reference signals differ from the standard frequencies an appropriate adjustment may be made to correct the frequency of the signal radiated from one or more of the transmitting stations.

A manually operated "Demand" switch 189 is provided for energizing the motor 147 independently of both of the cam operated switches. The switch 189 may be depressed at any time during the operating cycle to initiate the five minute cycling period of the motor driven selector switch 117. As will be evident from the ensuing description the switch 189 is used to provide a medium or coarse ambiguity check whenever the operator has reason to believe that the lane identification provided at the mobile receiving unit is in error.

As was indicated above, the switches 115 and 116 may be selectively operated to render the transmitting system effective to radiate any of the four frequency channels continuously or, in the alternative, the transmitting system may be rendered effective to radiate the $F_1$ signals alternately with any of the other three signals $F_2$, $F_3$ or $F_4$. These manually selected operating conditions are generally used to check the operation of the transmitting system or for testing the equipment. To permit the continuous radiation of the signals of any one channel, the switch 115 is placed in the "Test" position shown in FIG. 3 whereupon both sections 133 and 134 of the keying switch 118 are bypassed. If it is desired to radiate signals in the $F_1$ channel continuously, the selector switch 116 is moved to the position where its wipers 119a and 120a engages the contacts 129 and 130. Under these conditions none of the tone switching signals is passed to the mixer 109 and, as a consequence, all three of the stations 11, 12 and 13 are effective to radiate signals in the $F_1$ position indicating channel. Signals in the $F_2$ channel may be radiated continuously with the switch 115 in its "Test" position by moving the selector switch 116 to the position where its wipers 119a and 120a respectively engage the contacts 127 and 128, thus continuously supplying the tone switching signal $A_1$ from the oscillator 111 to the modulator 110. The carrier wave $F_R$ is thus continuously modulated with the $A_1$ switching signal and the stations 11, 12 and 13 are rendered effective by the latter signal to radiate continuously the signals in the $F_2$ channel. Signals in the $F_3$ channel are continuously radiated when the selector switch 116 is moved to the position where its wipers 119a and 120a engage the contacts 125 and 126, respectively, thus supplying the tone switching signal $A_2$ from the oscillator 113 to the modulator 110. The carrier wave $F_R$ is thus continuously modulated with the $A_2$ switching signal and the stations 11, 12 and 13 respond to the latter signal by continuously radiating signals in the $F_3$ channel. Finally, the switch 116 may be moved to the position where its wipers 119a and 120a engage the contacts 123 and 124 to supply the output of the oscillator 112 to the modulator 110, with the result that the carrier wave $F_R$ is continuously modulated with the $A_3$ switching signal and the stations 11, 12 and 13 are rendered effective to radiate signals in the $F_4$ channel.

With the switch 115 in its "Normal" position, the keying switch is effective to alternately interrupt the tone switching signal supplied to the modulator 110. Thus, the selector swicth 117 may be moved to the position where the wipers 119a and 120a engage the contacts 127 and 128 in order to alternately modulate the carrier wave $F_R$ with the tone switching signal $A_1$ for any desired period. Under these conditions the stations 11, 12 and 13 alternately radiate the signals in the $F_1$ channel and the ambiguity resolution signals in the $F_2$ channel. Similarly, with the switch 115 in its "Normal" position, when the selector switch 117 is moved to the position where its wipers 119a and 120a engage the contacts 125 and 126, the stations 11, 12 and 13 alternately radiate the signals of the $F_1$ channel and the ambiguity resolution signals of the $F_3$ channel. Finally, when the selector switch 117 is moved to the position where its wipers engage the contacts 123 and 124 with the switch 115 still in the "Normal" position, the stations 11, 12 and 13 alternately radiate the signals in the $F_1$ channel and the ambiguity resolution signals in the $F_4$ channel.

As is shown in FIG. 4 of the drawings, the equipment provided at the mobile receiving unit 10 comprises a single receiving antenna 190 connected to an antenna coupler circuit 191 to supply input signals for three superheterodyne receivers 192, 193 and 194. The receiver 192 has its RF circuits tuned to accept the signals of the position indicating channel $F_1$ but to reject the signals of the remaining channels in the system. The signal input circuits of the receiver 194, on the other hand, are tuned to accept the carrier wave $F_R$ and its modulation components but to reject the remaining signals in the channels $F_1$, $F_2$, $F_3$ and $F_4$. The receiver 193 has its local oscillator signals supplied from an external local oscillator in a manner somewhat similar to the receiver 104 employed at the reference station. The signal input circuits of the receiver 193 are tuned to accept all three of the ambiguity resolution signal channels $F_2$, $F_3$ and $F_4$ and to reject the carrier wave $F_R$. The receiver 192 is effective during each of the intervals when the transmitting system is radiating signals in the $F_1$ channel to heterodyne these signals in pairs to develop the difference frequencies therebetween. Thus, the signals received from the transmitting stations 11 and 12 are heterodyned to develop a 135 cycle beat or difference frequency signal which is passed through a bandpass filter 195 to a phase comparison or indicating circuit 196 which will be described more fully hereinafter. The 315 cycle difference signal developed by heterodyning the waves received from the stations 12 and 13 is passed through a bandpass filter 197 to a second phase comparison or indicating circuit 198 which is represented simply by a block in FIG. 4 but is similar to the phase comparison circuit 196 shown in somewhat greater detail. The difference frequency between the signals received from the end stations 11 and 13 is, of course, rejected by both of the filters 195 and 197 and, hence, has no effect upon the operation of the equipment at the mobile receiving unit 10.

The receiver 193 is broadly tuned to accept the signals in all three of the ambiguity resolution signal channels $F_2$, $F_3$ and $F_4$. Since the signals in only one of these ambiguity resolution channels are radiated during any particular interval, the signals of all three channels do not, of course, arrive at the receiver 193 simultaneously. The three signals of each channel arriving at the receiver 193 at any one time are heterodyned in pairs to develop the 135 cycle difference signal between the signals radiated from the stations 11 and 12 and the 315 cycle difference frequency between the signals received from the stations 12 and 13. The 450 cycle difference between the signals arriving from the stations 11 and 13 is also developed by the receiver 193 but, here again, this signal has no effect on the operation. The 135 cycle difference signals are passed through a bandpass filter 199 to the phase comparison circuit 196 for the purpose of providing ambiguity resolution in a manner which will become evident as the description proceeds. The 315 cycle difference signals are passed through a bandpass filter 200 to the phase comparison circuit 198 in order to provide ambiguity resolution for the phase indication provided by the latter circuit.

The reference receiver 194 is tuned to accept the carrier wave $F_R$ radiated from the reference station 14 and to reject the other four frequency channels utilized in the system. The receiver 194 detects the modulation components appearing upon the carrier wave radiated by the reference station 14 and develops these modulation components at its output terminals. The 135 cycle reference signals detected by the receiver 194 are passed through a bandpass filter 201 to the phase comparison circuit 196 while the 315 cycle reference signal is passed through a filter 202 to the phase comparison circuit 198. The detected tone switching signals $A_1$, $A_2$ and $A_3$ are respectively passed through bandpass filters 203, 204 and 205 to a relay switching circuit generally indicated at 230 which performs the function of conditioning the mobile receiving equipment to correspond with the frequency channel being radiated by the stations 11, 12 and 13. This is accomplished by connecting to the receiver 193 the proper local oscillator for the frequency channel being utilized. In addition, the relay switching circuit 230 conditions the phase comparison circuits 196 and 198 to provide either a fine position indication or a fine, coarse or medium ambiguity resolution indication in a manner which will become evident as the description proceeds.

The phase comparison circuit 196 may be referred to as the Green comparison circuit since it utilizes the signals supplied from the receivers 192, 193 and 194 to provide on an indicating device or meter 206 a fine position indication representative of the location of the mobile receiving unit 10 relative to the Green family of closely spaced, hyperbolic, isophase lines having foci at the center transmitting station 12 and the Green end station 11. The phase comparison circuit 198 may be referred to as the Red circuit because it provides a similar fine position indication representative of the location of the mobile receiving unit relative to closely spaced, hyperbolic, isophase lines of the Red family having foci at the center station 12 and the Red end station 13. Only the phase comparison circuit 196 will be described in detail since the circuit 198 is identical thereto and performs in a manner which will become obvious after the description of the circuit 196. The phase comparison circuit 196 is generally similar to that described and claimed in United States Patent No. 2,551,211 granted to James E. Hawkins and Beverly W. Koeppel and assigned to the same assignee as the present invention. Reference to the latter patent may be taken for a more detailed description of the operation of the individual components of the indicating equipment. Thus, the Green phase comparison circuit 196 comprises a phase discriminator and servo-amplifier circuit 207 for supplying drive signals to a servo-motor 208 having its output shaft 209 connected through reduction gearing 210 to drive the rotor of a control transformer or resolver 211. The rotor of the latter resolver is, in turn, connected, as indicated by the broken line 212, to drive a rototable pointer 213 which forms part of the indicator 206. The pointer rotates over a circular face or plate having suitable graduations around its periphery to permit the indicating of the phase relationship between the two signals applied to the input terminals of the phase comparison circuit 196. One set of signal input terminals 207a of the phase discriminator and amplifier circuit 207 is supplied with 135 cycle reference signals passed through the bandpass filter 201 while a second set of signal input terminals 207b of this phase discriminator receives excitation from the 135 cycle beat or heterodyne signals passed through the filter 195 and through the resolver 211. The phase discriminator 207 operates in conventional manner to compare the 135 cycle signals supplied to its two sets of input terminals, and to develop a D.C. control signal whenever the compared signals differ in phase. The polarity of the D.C. control signal depends upon the direction of the deviation while the amplitude of the signal, of course, depends upon the amount of the phase difference. This control signal is utilized in a manner which will be apparent to those skilled in this art to control the direction of drive of the servo-motor 208.

As is described in the above-identified Patent No. 2,551,211, the control transformer or resolver 211 includes a rotor winding and a pair of stator windings, the latter being displaced mechanically 90 degrees apart and being excited with excitation signals displaced 90 degrees in phase. The stator windings of the resolver 211 are thus excited by 135 cycle signals which are displaced 90 degrees in phase as, for example, by using a phase shifting network not illustrated in the drawings, but forming part of the resolver circuit. The voltages induced in the rotor winding of the resolver 211 are of constant amplitude but have a phase relationship which depends upon the position of the rotor winding relative to the fixed stator windings. The output voltage from the resolver 211 is, of course, derived from the rotor winding and is supplied to the input terminals 207b of the phase discriminator and servo-amplifier circuit 207 via a conductor 215. In the event that the signals supplied to the input terminals 207a and 207b of the phase discriminator are not in phase, a control signal is supplied to the motor 208 to drive the rotor of the resolver 211 in a direction to bring the phase of the signals supplied to the terminals 207b into coincidence with the reference signals supplied to the terminals 207a. This arrangement provides a balanced servo loop with the position of the rotor of the resolver 211 and, hence, the position of the pointer 213 indicating the phase relationship between the reference signal passed by the filter 201 and the beat or heterodyne signal passed by the filter 195. Thus, the pointer 213 cooperates with the graduated scale on the face of the indicator 206 to indicate the position of the mobile receiving unit 10 along one of the hyperbolic lines of the Green family. The indicating scale on the face provides a continuous reading from zero degrees to 360 degrees and, hence, one complete revolution of the pointer 213 during movement of the mobile craft carrying the receiving unit 10 indicates that a lane of the Green family has been crossed. The lanes of the Green family to which the indications on the indicator 206 pertain are spaced apart along the base line between the stations 11 and 12 by a distance equal to one-half wave length of the frequency of the $F_1$ position indicating channel and, since these lanes diverge on both sides of the base line, a greater distance must be traversed in other areas to cause a complete revolution of the pointer 213. The latter pointer is connected through mechanism not illustrated in the drawings to drive a set of integrating counters 216 which register the number of complete 360 degree revolutions of the pointer 213 and, hence, provide a count to identify the Green lane within which the mobile receiving unit is located. The phase comparison circuit 198 drives a pointer 251a of an indicator 251 to identify the position of the mobile craft along one of the hyperbolic isophase lines of the Red family having foci at the stations 12 and 13 in order to provide a fine or accurate position indication. A set of integrating counters 252 count the number of lanes of the Red family traversed to identify the particular Red lane within which the mobile craft is located. Thus, in operation the mobile receiving unit 10 enters the field of radiation of the transmitting units 11, 12, 13 and 14 at a known geographic location and, at this time, the indicators 206 and 251 and their associated counters 216 and 252 are initially set until the readings correspond to the known geographic location. The pointers of the indicators are given in response to the received signals when the mobile craft is moved from the known geographic location.

As thus far described, the indicating equipment is similar to that disclosed in the above-identified Patent No. 2,551,211 and, hence, as long as the system remains in continuous operation following the start of the mobile receiving unit at the known geographic location, the pointers 213 and 251a and the revolution counters 216 and 252 function continuously to provide position information. In the event of an equipment failure either at the transmitting stations or in the receiving equipment at the mobile unit, the signal drive to either or both of the phase comparison circuits 196 or 198 is interrupted and, as a consequence, the pointers and integrating counters of the non-excited circuit will maintain the positions occupied just prior to the interruption. In the ensuing description only the operation of the Green comparison circuit 196 will be considered.

The indications of the pointer 213 and the counter 216 will be maintained despite movement of the mobile craft within the radiation field of the transmitters during the interruption period and, hence, when the source of trouble has been located and repaired and when the system is restored to normal operation, the indications provided will no longer be accurate. More specifically, when the system operation is restored, the 135 cycle reference signal and the 135 cycle beat signal respectively passed by the filters 201 and 195 will immediately excite the phase discriminator and servo-amplifier circuit 207 to drive the motor 208 until the servo loop is balanced whereupon the pointer 213 provides an accurate indication of the hyperbolic, isophase line of the Green family along which the mobile receiver unit is located. However, if the mobile receiving unit has traversed one or more full lanes of the Green family during the period of interruption of operation, the revolution counter 216 no longer provides an accurate lane count.

In accordance with an important feature of the present invention, however, a retrieving or ambiguity resolution circuit indicated generally by the reference numeral 220 is provided to facilitate the retrieving of the lost lane information. This retrieving circuit functions to provide an alarm or indication informing the operator that one or more lanes of the Green family has been lost and, in addition, the operator is apprised of the direction of deviation of the lane counter 216 from the proper lane count. Thus, in order to obtain the proper lane count, the operator merely operates a manually operated adjusting mechanism 254 to turn the counter 216 through the number of complete revolutions required to shut off the alarm or failure indicator. More specifically, the retrieving circuit 220 is divided into three ambiguity resolution systems, namely, a fine system 260 utilizing the signals of the $F_2$ signal channel, a medium system 261 utilizing the signals of the $F_3$ signal channel and a coarse system 262 utilizing the signals of the $F_4$ channel. Each of the ambiguity resolution systems includes a resolver or control transformer these being indicated at 221, 222 and 223 and each having its rotor driven from the rotor of the resolver 211 through mechanical drive connections respectively indicated by the broken lines 224, 225 and 226. Each of the mechanical drive connections 224, 225 and 226 includes a fixed ratio gearing with the gearing in the drive train 224 being indicated by the reference numeral 227, that in the drive train 225 being indicated by the reference numeral 228 and the one in the drive train 226 being indicated by the reference numeral 229. The stator windings of each of the resolvers 221, 222 and 223 are similar to those of the resolver 211 since they are displaced mechanically by 90 degrees and are excited by quadrature or 90 degree phase related components developed from the 135 cycle signals passed by the bandpass filter 199. The signals induced in the rotor winding of each of the resolvers 221, 222 and 223 is again of constant amplitude but varies in phase as a function of the position of the rotor. The signals induced in the rotor windings of the control transformers 221, 222 and 223 are applied to one set of input terminals 231a of a phase discriminator circuit 231 through relay contacts of the relay switching circuit 230. The latter circuit is, of course, rendered automatically effective to connect the discriminator 231 to the fine, medium or coarse ambiguity resolution system corresponding to the signals being radiated from the stations 11, 12 and 13. A second set of signal input terminals 231b of the phase discriminator 231 is excited by the 135 cycle reference signals passed by the filter 201. The phase discriminator circuit 231 is of conventional construction and provides a D.C. output signal whenever the two signals applied to its signal input terminals 231a and 231b are displaced in phase. Here again, the polarity of the latter output signal is determined by the direction of the phase deviation between the two applied input signals while the magnitude of the D.C. output signal is a function of the amount of the phase displacement. When this output signal exceeds a predetermined value, for example, when the signals applied to the input terminals 231a and 231b differ by more than five degrees in phase, it becomes sufficient to energize a relay 232 connected in the output circuit of the discriminator 231.

As long as the transmitting and receiving equipment of the system remains in continuous, uninterrupted operation, the rotors of the resolvers 221, 222 and 223 are driven from the rotor of the resolver 211 with the relative rates of drive being determined by the gear ratio of the gearings 227, 228 and 229. During this continuous operation any slight difference in phase between the 135 cycle reference signals and the 135 cycle beat frequency signals developed from heterodyning the signals of the ambiguity resolution channels is insufficient to develop a control signal of sufficient amplitude to energize the relay 232. The D.C. control signal developed by the phase discriminator 231 is also applied to a galvanometer type indicating meter 233 which includes a pointer 233a normally positioned at the center of an indicating scale or plate 234 in the absence of current flow through its deflection coil. A deviation in phase in one direction between the signals appearing at the terminals 231a and 231b causes the pointer 233a to be deflected to the right while a phase deviation in the opposite direction is effective to deflect the pointer 233a to the left from its center or zero position.

When the relay 232 is energized, its contacts 232a are closed to complete a circuit from a suitable source of power 235 through conductor 236, through a manually operated alarm on-off switch 237 to an aural type failure indicator or alarm 238 which may take the form of a bell type alarm. The power supply 235 also supplies current for a visual type failure indicator in the form of indicating lights 239, 240 and 241 which are connected to ground through relay contacts of the relay switching circuit 230 in a manner described more fully below. The indicating lights 239, 240 and 241 and the alarm 238 inform the operator that the integrating counter 216 has lost the lane count and the lights also indicate which of the ambiguity resolution systems 260, 261 or 262 is unbalanced. The indication appearing upon the meter 233 informs the operator as to the direction in which the manual adjusting mechanism 254 must be turned in order to correct the counters. Obviously, in the event of a loss of lane count the operator merely turns the mechanism 254 manually in the proper direction to restore the lane count until a point is reached where the signals supplied to the relay 232 from the phase discriminator 231 are no longer sufficient to maintain the latter relay energized whereupon the alarm 238 and the lights 239, 240 and 241 are extinguished.

Considering next the relay switching circuit 230 and referring still to FIG. 4 of the drawings, it will be apparent that this circuit includes three relays 245, 246 and 247 for respectively rendering effective the fine, medium and coarse ambiguity resolution systems 260, 261 and 262. The relay 245 has its operating coil connected to the output of the bandpass filter 203 so that it is energized by the detected tone switch signal $A_1$ while the relay 246 has its operating coil connected to the output of the bandpass filter 204 to permit its energization by the tone signal $A_2$ and the relay 247 has its operating coil connected to the output circuit of the bandpass filter 205 to permit the detected tone signal $A_3$ to energize this relay. The operating coil of the relay 245 is connected to ground through one set of contacts 246a of the relay 246 while the operating coil of the latter relay is connected to ground through contacts 247a of the relay 247.

The operating coil of the relay 247 is grounded through the contacts 245a of the relay 245. The relays 245, 246 and 247 further include contacts 245b, 246b and 247b for respectively connecting the outputs of oscillators 248, 249 and 250 to the receiver 193 in order to supply a local oscillator signal corresponding to the ambiguity resolution signal channel $F_2$, $F_3$ or $F_4$ being radiated from the stations 11, 12 and 13. The relays 245, 246 and 247 include further sets of contacts 245c, 246c and 247c for connecting the resolver 221, 222 or 223 of the fine, medium or coarse systems to the phase discriminator 231 to correspond with the ambiguity resolution signal channel being radiated from the transmitting stations 11, 12 and 13. Each of the relays 245, 246 and 247 includes three additional sets of contacts exactly like the contacts shown in FIG. 4 for use in the Red phase comparison circuit 198 in a manner which will become apparent as the description proceeds although these additional sets of contacts are not illustrated in the drawings.

Considering the operation of the mobile receiving equipment 10 during the first 25 minutes of the cycle when the three transmitting stations 11, 12 and 13 are alternately radiating signals in the $F_1$ position indicating signal channel and ambiguity resolution signals in the channel $F_2$, it will be recognized that during the first such interval, that is, when the $F_1$ position indicating signals are being radiated, the receiver 192 develops the 135 cycle and 315 cycle heterodyne or beat signals in the manner indicated above. During this particular portion of the cycle, the receiver 193 receives no input signals, but the receiver 194 reproduces the 135 cycle and 315 cycle reference signals modulated on the carrier wave $F_R$ radiated from the reference station 14. The 135 cycle beat or difference signal passed by the filter 195 is supplied to the phase comparison circuit 196 and specifically to the stator windings of the resolver 211 while, at the same time, the 135 cycle reference signal passed by the filter 201 is applied to the signal input terminals 207a of the phase discriminator and servo-amplifier 207. The phase comparison circuit 196 functions in a manner which will be apparent to those skilled in this art to drive the pointer 213 of the indicator 206 to a position indicating the phase relationship between the two applied input signals thus providing a fine position indication representing the location of the mobile craft along one of the isophase lines of the Green family having foci at the stations 11 and 12. The lane count appearing on the integrating counters 216 is checked by the fine ambiguity resolution system 260 during each of the second intervals or portions of the first 25 minutes of the cycle when the signals from the stations 11, 12 and 13 fall within the $F_2$ ambiguity resolution channel. It will be recalled that during this second portion, the carrier wave radiated from the reference station 14 is modulated with the tone switching signal $A_1$. The latter switching signal is detected by the receiver 194 along with the 135 cycle and 315 cycle reference signals modulated upon the carrier wave $F_R$. During this particular portion of the cycle, the receiver 192 receives no input signals but the receiver 193 accepts the three ambiguity resolution signals falling within the channel $F_2$ and radiated from the stations 11, 12 and 13. The tone switching signal $A_1$ is passed through the bandpass filter 203 to energize the relay 245. Since the relays 246 and 247 are deenergized at this time, it will be apparent that the operating coil of the relay 245 is connected through the contacts 246a to ground. When the relay 245 is energized, the contacts 245b are closed to connect the output of the oscillator 248 to the receiver 193 thus supplying a local oscillator signal having a frequency of $F_2+455$ kilocycles. The receiver 193 is thus conditioned to heterodyne in pairs the three signals of the $F_2$ signal channel in order to develop the 135 cycle and 315 cycle beat or difference frequencies therebetween. When the relay 245 is energized its contacts 245a are effective to connect the signal indicator 239 to ground so that this indicating light will be illuminated if the relay 232 is energized. Energization of the relay 245 also closes contacts 245c to complete a circuit from the rotor of the resolver 221 to the signal input terminals 231a of the phase discriminator 231, thus rendering the fine ambiguity resolution system 260 effective. The phase discriminator 231 is thus excited by the 135 cycle reference signal passed by the bandpass filter 201 to the input terminals 231b and by the 135 cycle beat or difference signal passed through the bandpass filter 199 and induced in the rotor of the resolver 221. It will be apparent that a direct phase comparison of the two 135 cycle signals supplied to the phase discriminator 231 during this portion of the cycle would provide a fine position indication representing the location of the mobile receiving unit relative to hyperbolic, isophase lines having foci at the units 11 and 12. The latter family of lines, hereinafter called the second Green family, would have the same foci as the Green family referred to above but the spacings therebetween would be somewhat different due to the difference in frequencies employed. Thus, if the mobile receiving unit were moved to traverse the isophase lines of both families, it is apparent that the lines of the Green family to which the indications on the meter 206 pertain will be crossed at a somewhat faster rate than those of the second Green family. If the resolver 221 and the phase discriminator 231 were connected in a balanced servo loop like that supplying drive for the indicator 206, a position indication would be provided and the rotor of the resolver 221 would rotate somewhat more slowly than the rotor of the resolver 211, the ratio between these rates of rotation being equal to the ratio between the frequencies of the $F_1$ and $F_2$ signal channels. Thus, in order to compensate for the difference in lane width between the two hyperbolic families having foci at the stations 11 and 12 the gearing 227 has a ratio corresponding to that of the frequencies involved and, using the frequency ratio referred to above, the gearing 227 has a ratio of 1:0.9 and is a step down ratio in going from the rotor of the resolver 221. Thus, as long as the transmitting and receiving equipment remains in continuous operation without any interruptions of the type described above, the rotor of the resolver 221 turns somewhat slower than that of the resolver 211 and the signals supplied to the input terminals 231a and 231b of the phase discriminator 231 remain balanced so that the relay 232 is not energized. It can be seen that as the rotor of the resolver 211 rotates through 360 degrees as the mobile craft traverses one lane of the Green family the rotor of the resolver 221 must rotate through 360×0.9 or about 324 degrees. Since the rotor of the resolver 211 is not rotated during any period of interruption in the system operation, it is also apparent that the rotor of the resolver 221 remains stationary during any such period. As soon as the system is restored to normal operation, the rotor of the resolver 211 assumes a position reflecting the location of the mobile receiving unit along one of the hyperbolic isophase lines of the Green family in the manner described above. The rotation of the rotor of the resolver 211 in reaching the correct position following restoration of normal operation is also effective to drive the rotor of the resolver 221. If the mobile receiving unit has not crossed one of the lanes of the Green family during the period of system inoperation, the signal supplied to the terminals 231a and 231b of the phase discriminator 231 are in phase and, as a consequence, the relay 232 is not energized. Such a condition would indicate that the revolution counter 216 has not lost a lane count during the interruption period. If, however, the mobile receiving unit 10 has traversed one or more lanes of the Green family during the period of system interruption, the movement of the rotor 211 following restoration to normal operation will not bring the phase discriminator 231 into balance. More specifically, since the rotor of the resolver 221 moves 0.9 degree for each degree of movement of the rotor of the resolver 211, the resolver 221 is 36 degrees out of balance for each lost lane. The sensitivity of the discriminator circuit 231 is such that a signal of sufficient amplitude to energize the relay 232 is developed whenever the unbalance of the signals supplied to the phase discriminator exceeds about five degrees. Therefore, if one lane of the Green family has been lost during the interruption period, the resulting 36 degree unbalance of the resolver 221 is sufficient to produce a drive signal at the output of the discriminator 231 of sufficient amplitude to energize the relay 232 thus completing the circuit to the alarm 238 and, at the same time, illuminating the indicating light 239. The meter 233 indicates the direction of unbalance, that is, this meter indicates whether the lane count is too high or too low and, hence, informs the operator as to the direction in which the adjusting mechanism 254 must be turned in order to establish the proper lane count. The mechanism 254 is, of course, adjusted or turned until the counters 216 are accurate. Adjustment of the mechanism 254 is effective through the drive connection 212 and through the drive mechanism 224 to rotate the rotor of the resolver 221 in a direction to reduce the unbalance between the signals supplied to the terminals 231a and 231b. Each revolution of the counters 216 is accompanied by a 324 degree rotation of the rotor of the resolver 221, thus effecting a corresponding change in the phase of the signals supplied to the terminal 231a. The adjusting mechanism 254 is obviously tuned through the number of complete revolutions necessary to balance the input signals to the phase discriminator 231 whereupon the D.C. output from this discriminator disappears and the relay 232 is no longer energized. The control of the phase comparison circuit 196 and the retrieving circuit 220 is then restored to the automatic operation in response to the signals detected at the mobile receiving unit.

If the mobile craft has traversed more than five lanes of the Green family during the period of system inoperation, the fine ambiguity resolution system 260 is ineffective to restore the proper lane count since the phase discriminator 231 will indicate a false null. This is due to the fact that the meter 233 indicates to the operator that the adjusting mechanism must be turned in the wrong direction whenever a phase displacement in excess of 180 degrees exists between the signals applied to the terminals 231a and 231b, an occurrence which would be caused, for example, by a reading on the counter 216 which differs more than five lanes from the correct count. Let it be assumed, for example, that the counter 216 is reading six lanes too high at the time when the system is restored to normal operation in which case the signals supplied to the terminals 231a and 231b will be 6×36° or 216 degrees out of phase. However, the discriminator 231 is unable to distinguish between signals 216 degrees out of phase and those which are 360°−216° or 144 degrees out of phase and since it provides an output signal indicative of phase displacements of less than 180 degrees the D.C. signal developed will indicate that the input signals are 144 degrees out of phase and will have a polarity indicating that the counter 216 is reading four lanes too low. When the operator turns the adjusting mechanism 254 in a direction to increase the reading of the counters 216 by four counts, the fine ambiguity resolution system is again balanced and the alarm 238 and the light 239 will be extinguished to indicate the balanced condition. However, this is a false null condition since the lane count on the counter 216 is actually ten counts too high.

The ambiguity resolution signals in the $F_3$ and $F_4$ channels drive the medium and coarse ambiguity resolution systems 261 and 262, respectively, to provide ambiguity resolution if the movement of the mobile craft exceeds five lanes. It will be recalled that pulses of the $F_3$ and $F_4$ signals are radiated for brief 20 second intervals during the five minute period at the end of each 30 minute cycle. During the period when the $F_3$ and $F_1$ signal channels are being alternately radiated, that is, during each 20 second period when the carrier wave $F_R$ is modulated with one-half second pulses of the tone switching signal $A_2$, the medium ambiguity resolution system 261 is effective to provide ambiguity resolution. During those intervals of this portion of the cycle when the $F_1$ position indicating signal channel is being received, the mobile receiving unit functions in the manner indicated above to supply 135 cycle beat and reference signals to the terminals 207a and 207b in order to provide the fine position indication. During those particular intervals of this portion of the cycle when the ambiguity resolution signals in the $F_3$ channel are being radiated from the stations 11, 12 and 13, the receiver 194 detects and reproduces the tone switching signal $A_2$ and, of course, reproduces the 135 cycle and 315 cycle reference signals. The relays 245 and 247 are, at this time, de-energized and, hence, the operating coil of the relay 246 is connected to ground through the contacts 247a. The application of the detected $A_2$ tone switching signal to the operating coil of the relay 246, of course, energizes this relay to close the relay contacts 246a in order to connect the indicating light 240 to ground. The relay contacts 246b are closed to connect the output of the oscillator 249 to the receiver 193 thus supplying a local oscillator signal of proper frequency for receiving the ambiguity resolution signals in the $F_3$ signal channel. The contacts 246c connect the rotor of the resolver 222 to the terminal 231a of the phase discriminator 231. The gearing 228 connecting the rotor of the resolver 211 to the rotor of the resolver 222 has a ratio equal to the ratio between the frequencies of the signals in the channels $F_1$ and $F_3$ and, with the particular frequency ratio indicated above, a gearing having a ratio of 1:0.99 is utilized. In view of the foregoing description it will be apparent that when the system is operating properly, the rotor of the resolver 222 turns through an angle of 356.4 degrees for each complete revolution of the pointer 213. Thus, during any period of system inoperation, each lane crossed by the mobile craft carrying the receiving unit 10 will introduce an unbalance of 3.6 degrees in the signals supplied to the phase discriminator 231 from the medium ambiguity resolution system 261. Thus, if more than five lanes have been traversed during the interruption period, the signals supplied to the phase discriminator 231 when the medium system 261 is effective will not be balanced in phase even though the servo loop including the resolver 211 is balanced and even though the signals supplied to the phase discriminator 231 by the fine system 260 may be balanced in a false null position. The unbalanced condition of the phase discriminator 231 when the medium system 261 is effective will, of course, indicate the false null of the fine system by energizing the relay 232 to set off the alarm 238 and to illuminate the light 240. The proper lane count is then manually set into the system by adjusting the mechanism 254 in the manner previously described. The accuracy of the medium system just described is limited to fifty lanes (180 degrees of phase difference between the signals supplied to the discriminator 231 when the medium system is effective) in either direction and, hence, if more than fifty lanes are crossed during the interruption period the medium system will provide a false null for reasons which will be obvious in view of the foregoing description.

The coarse ambiguity resolution system 262 becomes effective when the tone switching signal $A_3$ is modulated upon the carrier wave $F_R$ and acts to indicate any false null of the medium system 261 in the event that more than fifty lanes are traversed. More specifically, during the interval when the tone switching signal $A_3$ appears on the carrier wave $F_R$, the receiver 194 reproduces both this switching signal and the 135 cycle and 315 cycle reference signals developed at the reference station by heterodyning the signals in the $F_4$ channel. The $A_3$ tone switching signal is passed through the filter 205 to energize the relay 247 which closes its three sets of contacts. The contacts 247a connect the indicating light 241 in the circuit so that if the relay 232 is energized, this light becomes illuminated to inform the operator that the coarse ambiguity resolution system 262 is not balanced. The relay contacts 247b connect the output of the oscillator 250 to the receiver 193 in order to supply a local oscillator signal of proper frequency to permit the effective reception and heterodyning of the signals in the $F_4$ ambiguity resolution signal channel. Contacts 247c connect the rotor of the resolver 223 to the input terminals 231a of the phase discriminator 231. The gearing 229 connecting the rotor of the resolver 211 is connected to the rotor of the resolver 233 and has a ratio equal to the ratio of the frequencies of the $F_1$ and $F_4$ channels or, in the specific example given above, a ratio of 1:0.999. Thus, for each complete revolution of the rotor of the resolver 211 and the pointer 213 the rotor of the resolver 223 is turned through an angle of 359.64 degrees. In view of the foregoing description it will be recognized that each lane lost during any period of system interruption will introduce an error of 0.36 degree in the signal developed by the resolver 223. Thus, if more than fifty lanes have been traversed during the interruption period, an unbalance of at least 9 degrees will exist between the signals at the input terminals 231a and 231b of the phase discriminator 231 even though both the fine and medium ambiguity resolution systems 261 and 262 may be completely balanced. Since an error of 9 degrees is adequate to develop at the output of the discriminator 231 a control signal of sufficient amplitude to energize the relay 232 and illuminate the light 241, the operator will be informed that the coarse system is unbalanced and he may adjust the mechanism 254 to insert the fifty or more lanes required to bring all three ambiguity resolution systems into balance. Thus, it will be observed that the system described is effective to provide complete ambiguity resolution for any movement of the mobile craft up to 500 lanes during the period of interruption. It will also be apparent from the foregoing description that similar fine, medium and coarse ambiguity resolution systems are utilized for the phase comparison circuit 198 so that its counter 252 may be operated to maintain the proper lane count for the Red family of hyperbolic lines having foci at the transmitting stations 12 and 13.

In view of the foregoing description, it will be recognized that the system described is effective to perform all of the enumerated objects of the invention. The transmitting facilities may be utilized with any number of mobile receiving units and, in the event that some of these units are of the type presently in use and not equipped with ambiguity resolution systems in the form of the retrieving circuit 220 the latter units will, nevertheless, be effective to provide the fine position indications although obviously no means will be provided for checking the lane count appearing on their integrating counters.

While a particular embodiment of the invention has been illustrated and described, it will be recognized that many modifications will readily occur to those skilled in this art and it is therefore contemplated by the appended claims to cover any such modifications as fall within the true spirit and scope of the invention.

What is claimed as new and desired to be secured by Letters Patent of the United States is:

1. Mobile receiving equipment for use in a hyperbolic, continuous wave, radio position finding system for providing a position indication in response to signals received from at least two spaced apart transmitting stations, said equipment comprising means including an indicator movable repeatedly through a predetermined range of movement for providing a position indication representing the location of said mobile receiving equipment along one hyperbolic, isophase line of a family of such lines all having foci at said stations, said family of lines being divided into a plurality of lanes with each lane being represented by one movement of the indicator through said predetermined range, counting means driven in synchronism with said indicator for counting the number of repeated movements of said indicator through said range in order to count the number of lanes traversed by the mobile receiving equipment, means for manually setting the counting means, and means operated automatically in the event of inoperation of said transmitting stations or said receiving equipment for indicating that the lane count has been lost by said counting means during any such period of inoperation as soon as the inoperation no longer exists, the last named means including means for indicating the direction of deviation of the lost lanes so that the manual setting means may be operated in the proper direction to restore the lane count as soon at the system inoperation no longer exists.

2. Mobile receiving equipment for use in a hyperbolic, continuous wave, radio position finding system for providing a position indication in response to signals received from at least two spaced apart transmitting stations, said equipment comprising means for comparing the phase relationship between the received signals to provide a position indication representing the location of said mobile receiving equipment along one hyperbolic, isophase line of a family of such lines all having foci at said stations, said family of lines being divided into a plurality of lanes with each lane being represented by a 360° change in the phase relationship between the signals compared by the comparing means, counting means driven in synchronism with said comparing means for counting the number of lanes traversed by the mobile receiving equipment, means for manually setting the counting means, and means operated automatically in the event of inoperation of said transmitting stations or said receiving equipment for indicating that the lane count has been lost by said counting means during any such period of inoperation as soon as the inoperation no longer exists, the last named means including means for indicating the direction of deviation of the lost lanes so that the manual setting means may be operated in the proper direction to restore the lane count as soon as the system inoperation no longer exists.

3. Equipment for use in a transmitting and receiving system of the hyperbolic, continuous wave, radio position finding system to provide an indication of the position of a mobile craft, said equipment comprising means for comparing the phase relationship between signals received from the transmitting portion of the system to provide a position indication representing the location of said mobile craft along one hyperbolic, isophase line of a family of such lines all having common foci, said family of lines being divided into a plurality of lanes with each lane being represented by a 360° change in the phase relationship between the signals compared by the comparing means, counting means driven in synchronism with said comparing means for counting the number of lanes traversed by the mobile craft, means for manually setting the counting means, and means operated automatically in the event of inoperation of said transmitting staitons or said receiving equipment for indicating that the lane count has been lost by said counting means during any such period of inoperation, the last named means including means for indicating the direction of deviation of the lost lanes so that the manual setting means may be operated in the proper direction to restore the lane count as soon as the system inoperation no longer exists.

4. Equipment for use in a hyperbolic, continuous wave, radio position finding system to provide an indication of the position of a mobile craft, said equipment comprising means including an indicator movable repeatedly through a predetermined range of movement for providing a position indication representing the location of said mobile craft along one hyperbolic, isophase line of a family of such lines all having common foci, said family of lines being divided into a plurality of lanes with each lane being represented by one movement of the indicator through said predetermined range, counting means driven in synchronism with said indicator for counting the number of repeated movements of said indicator through said range in order to count the number of lanes traversed by the mobile craft, means for manually setting the counting means, and means operated automatically in the event of temporary inoperation in said system for indicating that the lane count has been lost by said counting means during any such period of inoperation, the last named means including means for indicating the direction of deviation of the lost lanes so that the manual setting means may be operated in the proper direction to restore the lane count as soon as the system inoperation no longer exists.

5. A hyperbolic, continuous wave, radio position finding system comprising first and second transmitting stations for radiating first and second pairs of signals with one signal of each pair being radiated from each station, means in said system for heterodyning the signals of each pair to develop first and second difference signals and for transmitting first and second reference signals respectively derived from the first and second difference signals as modulation components upon at least one carrier wave, and mobile receiving equipment including means for reproducing said first and second reference signals and for heterodyning each pair of signals to develop first and second heterodyne signals, means in the receiving equipment for comparing the phase relationship between the first reference signal and the first heterodyne signal to provide a position indication representing the location of said mobile receiving equipment along one hyperbolic, isophase line of a family of such lines all having foci at said transmitting stations, said family of lines being divided into a plurality of lanes with each lane being represented by a 360° change in the phase relationship between the signals compared by the comparing means, means for counting the number of lanes traversed by the mobile receiving equipment, means for manually setting the counting means, and means operated automatically in response to said second reference signal and said second heterodyne signal in the event of temporary inoperation in the system for indicating that the lane count has been lost by said counting means during any such period of inoperation, the last named means including means for indicating the direction of deviation of the lost lanes so that the manual setting means may be operated in the proper direction to restore the lane count as soon as the system inoperation no longer exists.

6. A hyperbolic, continuous wave, radio position finding system comprising at least three spaced apart transmitting stations for radiating first and second groups of signals with one signal of each group being radiated from each station, means in said system for heterodyning in pairs the signals of each group to develop four difference signals and for transmitting four reference signals respectively derived from the four difference signals as modulation components upon at least one carrier wave, and mobile receiving equipment including means for reproducing said four reference signals and for heterodyning in pairs each group of signals to develop four heterodyne signals, first indicating means responsive to a first of the reference signals and a first of the heterodyne signals and including an indicator movable repeatedly through a predetermined range of movement for providing a first position indication representing the location of said mobile receiving equipment along one hyperbolic, isophase line of a first family of such lines all having foci at a first pair of said transmitting stations, second indicating means responsive to a second of the reference signals and to a second of the heterodyne signals and also including an indicator movable repeatedly through a predetermined range of movement for providing a second position indication representing the location of the mobile receiving equipment along a hyperbolic, isophase line of a second family of lines having foci at a second pair of said transmitting stations, each of said familites being divided into a plurality of lanes with each lane being represented by one movement of the corresponding indicator through its predetermined range, counting means driven in synchronism with each indicator for counting the number of repeated movements thereof through its range in order to count the number of lanes of each family traversed by the mobile receiving equipment, means for manually setting each of the counting means, means operated automatically in response to a third and fourth of the reference signals and to a third and fourth of the heterodyne signals in the event of inoperation of said system for indicating that the lane count has been lost by either of said counting means during any such period of inoperation, the last named means including means for indicating the direction of deviation of the lost lanes on either counting means so that the manual setting means of the two counting means may be operated in the proper direction to restore the lane count as soon as the system inoperation no longer exists.

7. A hyperbolic, continuous wave, radio position finding system comprising at least three spaced apart transmitting stations for radiating first and second groups of signals with one signal of each group being radiated from each station, means in said system for heterodyning in pairs the signals of each group to develop four difference signals and for transmitting four reference signals respectively derived from the four difference signals as modulation components upon at least one carrier wave, and mobile receiving equipment including means for reproducing said four reference signals and for heterodyning in pairs the signals of each group to develop four heterodyne signals, first indicating means responsive to the phase relationship between a first of the reference signals and to a first of the heterodyne signals to provide a first position indication representing the location of said mobile receiving equipment along one hyperbolic, isophase line of a first family of such lines all having foci at said transmitting stations, second indicating means responsive to the phase relationship between a second of the heterodyne signals and a second of the reference signals to provide a second position indication representing the location of the mobile receiving equipment along a hyperbolic, isophase line of a second family of lines having foci at a second pair of the transmitting stations, each of said families being divided into a plurality of lanes with each lane being represented by a 360° change in the phase relationship between the signals compared by the corresponding comparing means, means for counting the number of lanes of each family traversed by the mobile receiving equipment, means for manually setting each of the counting means, means operated automatically in response to a third and fourth of the reference signals and to a third and fourth of the heterodyne signals in the event of inoperation of said system for indicating that the lane count has been lost by either of said counting means during any such period of inoperation, the last named means including means for indicating the direction of deviation of the lost lanes on either counting means so that the manual setting means of the two counting means may be operated in the proper direction to restore the lane count as soon as the system inoperation no longer exists.

8. Mobile receiving equipment for use in hyperbolic, continuous wave, radio position finding systems to provide position indications in response to first and second groups of waves received from at least three spaced apart transmitting stations with each group containing at least three waves of slightly different frequency and with one wave in each group being radiated from each station, said receiving equipment also receiving first and second reference signals derived from heterodyning the waves of the first group and third and fourth reference signals derived from heterodyning the waves of the second group with said four reference signals appearing as modulation components upon waves received by said receiving equipment, second modulation components derived from heterodyning the waves of the first group; said equipment comprising first circuit means for reproducing said first and second reference signals and for heterodyning the waves of the first group in pairs to develop first and second heterodyne signals; second circuit means for reproducing said third and fourth reference signals and for heterodyning the waves of the second group in pairs to develop third and fourth heterodyne signals; first indicating means for comparing the phases of the first reference signal and the third heterodyne signal to provide a first position indication representing the location of the mobile receiving equipment relative to a first pair of the transmitting stations; second indicating means for comparing the phase relationship between the second reference signal and the fourth heterodyne signal to provide a second position indication representing the location of the mobile receiving equipment relative to a second pair of the transmitting stations; each of said indicating means including a phase discriminator responsive to the compared signals for developing a motor drive signal, servo motor means energized by the motor drive signal, a control transformer having a rotor driven by said motor means and a stator winding excited by one of the signals to be compared with said rotor having a winding thereon for supplying to the phase discriminator signals induced therein from the stator winding, an indicator driven from said rotor for providing the position indication, and a counter mechanism driven by said indicator for registering the lanes traversed by the mobile receiving equipment with each counter mechanism including a manually operated means for altering its count, each of said indicating means further including a circuit for indicating that the lane count has been lost by its counter mechanism as a result of lanes traversed by the mobile receiving equipment during any periods of system inoperation, the lost lane determining circuit of each indicating means including a resolver having a rotor driven from the rotor of the control transformer of that indicating means through gearing having a ratio substantially equal to the ratio between the mean frequencies of the two groups of waves, the lost lane determining circuit of the first indicating means further including a phase comparison circuit for comparing the phases of said third reference signal and said first heterodyne signal with one of the two last named signals being supplied to a stator winding of the resolver in the first indicating means and with the signal induced in the rotor winding of the latter resolver being supplied to said phase comparison circuit, the lost lane determining circuit of the second indicating means also including a phase comparison circuit for comparing the phases of said fourth reference signal and said second heterodyne signal with one of the two last named signals being supplied to a stator winding of the resolver of the second indicating means and with the signal induced in the rotor winding of the latter resolver being supplied to the phase comparison circuit of the second indicating means, each of said phase comparison circuits being effective to develop a unidirectional control signal having a polarity which is a function of the direction of any deviation in phase between the two signals compared thereby, and means responsive to said control signal for indicating the direction of any deviation of each counter mechanism as a result of the lost lanes so that the proper lane count may be restored by operating the manually operated means of any counter mechanism which has lost the lane count.

9. Mobile receiving equipment for use in hyperbolic, continuous wave, radio position finding systems to provide position indications in response to first and second groups of waves received from at least three spaced apart transmitting stations with each group containing at least three waves of slightly different frequency and with one wave in each group being radiated from said station and also in response to modulation components appearing upon at least one carrier wave with the modulation components being derived by heterodyning in pairs the waves of each group; said equipment comprising receiving means for reproducing said modulation components to develop first, second, third and fourth reference signals for heterodyning the waves of the first group in pairs to develop first and second heterodyne signals and for heterodyning the waves of the second group in pairs to develop third and fourth heterodyne signals; first indicating means for comparing the phases of the first reference signal and the first heterodyne signal to provide a first position indication representing the location of the mobile receiving equipment relative to a first pair of the transmitting stations; second indicating means for comparing the phase relationship between the second reference signal and the second heterodyne signal to provide a second position indication representing the location of the mobile receiving equipment relative to a second pair of the transmitting stations; each of said indicating means including an indicator for providing the position indication and a counter mechanism driven by said indicator for registering the lanes traversed by the mobile receiving equipment, each counter mechanism including manually operated means for setting its lane count, each of said indicating means further including an indicating circuit for indicating that one or more lanes have been traversed by the mobile receiving equipment during any periods of system inoperation, the indicating circuit of each indicating means including a resolver having a rotor driven with the indicator of that indicating means through gearing having a ratio substantially equal to the ratio between the mean frequencies of the two groups of waves, the indicating circuit of the first indicating means further including a phase comparison circuit for comparing the phases of said third reference signal and said third heterodyne signal with one of the two last named signals being supplied to a stator winding of the resolver in the first indicating means and with the signal induced in the rotor winding of the latter resolver being supplied to said phase comparison circuit, the indicating circuit of the second indicating means also including a phase comparison circuit for comparing the phases of said fourth reference signal and said fourth heterodyne signal with one of the two last named signals being supplied to a stator winding of the resolver of the second indicating means and with the signal induced in the rotor winding of the latter resolver being supplied to the phase comparison circuit of the second indicating means, and means responsive to the outputs from the phase comparison circuits for indicating the direction of deviation of the lost lane count by either of the counter mechanisms during any period of inoperation so that the manually operated means associated with either counter mechanism may be operated to restore the proper lane count.

10. Mobile receiving equipment for use in hyperbolic, continuous wave, radio position finding systems to provide position indications in response to first and second groups of waves received from at least three spaced apart transmitting stations with each group containing at least three waves of slightly different frequency and with one wave in each group being radiated from said station and also in response to modulation components appearing upon at least one carrier wave with the modulation components being derived by heterodyning in pairs the waves of each group; said equipment comprising receiving means for reproducing said modulation components to develop first, second, third and fourth reference signals for heterodyning the waves of the first group in pairs to develop first and second heterodyne signals and for heterodyning the waves of the second group in pairs to develop third and fourth heterodyne signals; first indicating means for comparing the phases of the first reference signal and the first heterodyne signal to provide a first position indication representing the location of the mobile receiving equipment relative to a first pair of the transmitting stations; second indicating means for comparing the phase relationship between the second reference signal and the second heterodyne signal to provide a second position indication representing the location of the mobile receiving equipment relative to a second pair of the transmitting stations; each of said indicating means including a phase discriminator responsive to the compared signals for developing a motor drive signal in response to deviation in phase between the compared signals, motor means driven by said motor drive signal, a control transformer having a rotor driven by said motor means and a stator winding excited by one of the signals to be compared with the rotor having a winding thereon for supplying to the phase discriminator signals induced therein from the stator winding, an indicator driven from said rotor for providing the position indication, a counter mechanism driven by said indicator for registering the lanes traversed by the mobile receiving equipment and manually operated means for setting the counter mechanism, each of said indicating means further including a circuit for indicating any loss of lane count by the mobile receiving equipment during any periods of system inoperation, the indicating circuit of each indicating means including a circuit for comparing the phases of said third reference signal and said third heterodyne signal to develop a first control signal and the indicating circuit of the second indicating means including a circut for comparing the phases of said fourth reference signal and said fourth heterodyne signal to develop a second control signal, and means responsive to the outputs from the phase comparison circuits for indicating the direction of deviation of any lane count loss by either of the counter mechanisms during any period of inoperation so that the manually operated means of either counter mechanism may be operated to restore the proper lane count.

11. In a transmitting system for use in a three foci hyperbolic, continuous wave, position finding system, first, second and third fixed transmitting stations each radiating a position indicating signal with said position indicating signals differing from each other in frequency but falling within a first frequency channel, a reference transmitting station radiating a carrier wave having a frequency distinguishable from said first frequency channel, means for generating a tone switching signal at said reference station, switch means for modulating said tone switching signal upon said carrier wave during spaced apart intervals, means at each of said fixed transmitting stations for receiving said carrier wave and detecting said tone switching signal, means at each of said fixed transmitting stations responsive to the detected tone switching signal for rendering each of the latter stations ineffective to radiate its position indicating signal and for rendering each such station effective to radiate an ambiguity resolution signal, said ambiguity resolution signals differing in frequency from each other but lying within a second frequency channel which is distinguishable from the first frequency channel and from the frequency of said carrier wave, the frequency difference between the ambiguity resolution signals radiated from the first and second stations being equal to the frequency difference between the position indicating signals radiated from the first and second stations and the frequency difference between the ambiguity resolution signals radiated from the second and third stations being equal to the frequency difference between the position indicating signals radiated from the second and third stations, receiving means at the reference station for receiving both the ambiguity resolution signals and the position indicating signals radiated from all three fixed stations, a first local oscillator effective to supply signals through said switch means to said receiving means during each of said intervals, a second local oscillator for supplying signals to said receiving means between said intervals, said first and second local oscillator signals differing in frequency by the separation between said first and second frequency channels, said receiving means being effective to heterodyne said ambiguity resolution signals in pairs during each of said intervals in order to develop a first difference signal from the ambiguity resolution signals radiated from the first and second stations and to develop a second difference signal from the ambigutiy resolution signals radiated from the second and third stations, said receiving means also being effective between said intervals to heterodyne the position indicating signals in pairs in order to develop a third difference signal from the position indicating signals radiated from the first and second stations and to develop a fourth difference signal from the position indicating signals radiated from the second and third stations, and means for modulating said carrier wave with reference signals respectively derived from said first, second, third and fourth difference signals.

12. In a transmitting system for use in a three foci hyperbolic, continuous wave, position finding system, first, second and third fixed transmitting stations each radiating a position indicating signal with said position indicating signals differing from each other in frequency but falling within a first frequency channel, a reference transmitting station radiating a carrier wave having a frequency distinguishable from said first frequency channel, means for generating a tone switching signal at said reference station, switch means for modulating said tone switching signal upon said carrier wave during spaced apart intervals, means at each of said fixed transmitting stations for receiving said carrier wave and detecting said tone switching signal, means at each of said fixed transmitting stations responsive to the detected tone switching signal for rendering each of the latter stations ineffective to radiate its position indicating signal and for rendering each such station effective to radiate an ambiguity resolution signal, said ambiguity resolution signals differing in frequency from each other but lying within a second frequency channel which is distinguishable from the first frequency channel and from the frequency of said carrier wave, the frequency difference between the ambiguity resolution signals radiated from the first and second stations being equal to the frequency difference between the position indicating signals radiated from the first and second stations and the frequency difference between the ambiguity resolution signals radiated from the second and third stations being equal to the frequency difference between the position indicating signals radiated from the second and third stations, receiving means at the reference station for receiving both the ambiguity resolution signals and the position indicating signals radiated from all three fixed stations, said receiving means being effective to heterodyne said ambiguity resolution signals in pairs during each of said intervals in order to develop a first difference signal from the ambiguity resolution signals radiated from the first and second stations and to develop a second difference signal from the ambiguity resolution signals radiated from the second and third stations, said receiving means also being effective between said intervals to heterodyne the position indicating signals in pairs in order to develop a third difference signal from the position indicating signals radiated from the first and second stations and to develop a fourth difference signal from the position indicating signals radiated from the second and third stations, and means for modulating said carrier wave with reference signals respectively derived from said first, second, third and fourth difference signals.

13. In a transmitting system for use in a three foci hyperbolic, continuous wave, position finding system, first, second and third fixed transmitting stations each radiating a position indicating signal with said position indicating signals differing from each other in frequency but falling within a first frequency channel, a reference transmitting station radiating a carrier wave having a frequency distinguishable from said first frequency channel, means for generating a tone switching signal at said reference station, switch means for modulating said tone switching signal upon said carrier wave during spaced apart intervals, means at each of said fixed transmitting stations for receiving said carrier wave and detecting said tone switching signal, means at each of said fixed transmitting stations responsive to the detected tone switching signal for rendering each of the latter stations ineffective to radiate its position indicating signal and for rendering each such station effective to radiate an ambiguity resolution signal, said ambiguity resolution signals differing in frequency from each other but lying within a second frequency channel which is distinguishable from the first frequency channel and from the frequency of said carrier wave, receiving means at the reference station for receiving both the ambiguity resolution signals and the position indicating signals radiated from all three fixed stations, a first local oscillator effective to supply signals through said switch means to said receiving means during each of said intervals, a second local oscillator for supplying signals to said receiving means between said intervals, said first and second local oscillator signals differing in frequency by the separation between said first and second frequency channels, said receiving means being effective to heterodyne said ambiguity resolution signals in pairs during each of said intervals in order to develop a first difference signal from the ambiguity resolution signals radiated from the first and second stations and to develop a second difference signal from the ambiguity resolution signals radiated from the second and third stations, said receiving means also being effective between said intervals to heterodyne the position indicating signals in pairs in order to develop a third difference signal from the position indicating signals radiated from the first and second stations and to develop a fourth difference signal from the position indicating signals radiated from the second and third stations, and means for modulating said carrier wave with reference signals respectively derived from said first, second, third and fourth difference signals.

14. In a transmitting system for use in a three foci hyperbolic, continuous wave, position finding system, first, second and third fixed transmitting stations each radiating a position indicating signal with said position indicating signals differing from each other in frequency but falling within a first frequency channel, a reference transmitting station radiating a carrier wave having a frequency distinguishable from said first frequency channel, means for generating a tone switching signal at said reference station, switch means for modulating said tone switching signal upon said carrier wave during spaced apart intervals, means at each of said fixed transmitting stations for receiving said carrier wave and detecting said tone switching signal, means at each of said fixed transmitting stations responsive to the detected tone switching signal for rendering each of the latter stations ineffective to radiate its position indicating signal and for rendering each such station effective to radiate an ambiguity resolution signal, said ambiguity resolution signals differing in frequency from each other but lying within a second frequency channel which is distinguishable from the first frequency channel and from the frequency of said carrier wave, receiving means at the reference station for receiving both the ambiguity resolution signals and the position indicating signals radiated from all three fixed stations, said receiving means being effective to heterodyne said ambiguity resolution signals in pairs during each of said intervals in order to develop a first difference signal from the ambiguity resolution signals radiated from the first and second stations and to develop a second difference signal from the ambiguity resolution signals radiated from the second and third stations, said receiving means also being effective between said intervals to heterodyne the position indicating signals in pairs in order to develop a third difference signal from the position indicating signals radiated from the first and second stations and to develop a fourth difference signal from the position indicating signals radiated from the second and third stations, and means for modulating said carrier wave with reference signals respectively derived from said first, second, third and fourth difference signals.

15. In a transmitting system for use in a three foci hyperbolic, continuous wave, position finding system, first, second and third fixed transmitting stations each radiating a position indicating signal with said position indicating signals differing from each other in frequency but falling within a first frequency channel, a reference transmitting station radiating a carrier wave having a frequency distinguishable from said first frequency channel, means for generating a tone switching signal at said reference station, switch means for modulating said tone switching signal upon said carrier wave during spaced apart intervals, means at each of said fixed transmitting stations for receiving said carrier wave and detecting said tone switching signal, and means at each of said fixed transmitting stations responsive to the detected tone switching signal for rendering each of the latter stations ineffective to radiate its position indicating signal and for rendering each such station effective to radiate an ambiguity resolution signal, said ambiguity resolution signals differing in frequency from each other but lying within a second frequency channel which is distinguishable from the first frequency channel and from the frequency of said carrier wave, the frequency difference between the ambiguity resolution signals radiated from the first and second stations being equal to the frequency difference between the position indicating signals radiated from the first and second stations and the frequency difference between the ambiguity resolution signals radiated from the second and third stations being equal to the frequency difference between the position indicating signals radiated from the second and third stations.

16. In a transmitting system for use in a two foci hyperbolic, continuous wave, position finding system, first and second fixed transmitting stations each radiating a position indicating signal with said position indicating signals differing from each other in frequency but falling within a first frequency channel, a reference transmitting station radiating a carrier wave having a frequency distinguishable from said first frequency channel, means for generating a tone switching signal at said reference station, switch means for modulating said tone switching signal upon said carrier wave during spaced apart intervals, means at each of said fixed transmitting stations for receiving said carrier wave and detecting said tone switching signal, means at each of said fixed transmitting stations responsive to the detected tone switching signal for rendering each of the latter stations ineffective to radiate its position indicating signal and for rendering each such station effective to radiate an ambiguity resolution signal, said ambiguity resolution signals differing in frequency from each other but lying within a second frequency channel which is distinguishable from the first frequency channel and from the frequency of said carrier wave, the frequency difference between the ambiguity resolution signals radiated from the first and second stations being equal to the frequency difference between the position indicating signals radiated from the first and second stations, receiving means at the reference station for receiving both the ambiguity resolution signals and the position indicating signals radiated from both of the fixed stations, a first local oscillator effective to supply signals through said switch means to said receiving means during each of said intervals, a second local oscillator for supplying signals to said receiving means between said intervals, said first and second local oscillator signals differing in frequency by the separation between said first and second frequency channels, said receiving means being effective to heterodyne said ambiguity resolution signals during each of said intervals in order to develop a first difference signal, said receiving means also being effective between said intervals to heterodyne the position indicating signals to develop a second difference signal, and means for modulating said carrier wave with reference signals respectively derived from said first and second difference signals.

17. In a transmitting system for use in a two foci hyperbolic, continuous wave position finding system, first and second fixed transmitting stations each radiating a position indicating signal with said position indicating signals differing from each other in frequency but falling within a first frequency channel, a reference transmitting station radiating a carrier wave having a frequency distinguishable from said first frequency channel, means for generating a tone switching signal at said reference station, switch means for modulating said tone switching signal upon said carrier wave during spaced apart intervals, means at each of said fixed transmitting stations for receiving said carrier wave and detecting said tone switching signal, means at each of said fixed transmitting stations responsive to the detected tone switching signal for rendering each of the latter stations ineffective to radiate its position indicating signal and for rendering each such station effective to radiate an ambiguity resolution signal, said ambiguity resolution signals differing in frequency from each other but lying within a second frequency channel which is distinguishable from the first frequency channel and from the frequency of said carrier wave, receiving means at the reference station for receiving both the ambiguity resolution signals and the position indicating signals radiated from both of the fixed stations, a first local oscillator effective to supply signals through said switch means to said receiving means during each of said intervals, a second local oscillator for supplying signals to said receiving means between said intervals, said first and second local oscillator signals differing in frequency by the separation between said first and second frequency channels, said receiving means being effective to heterodyne said ambiguity resolution signals during each of said intervals in order to develop a first difference signal, said receiving means also being effective between said intervals to heterodyne the position indicating signals to develop a second difference signal, and means for modulating said carrier wave with reference signals respectively derived from said first and second difference signals.

18. In a transmitting system for use in a two foci hyperbolic, continuous wave, position finding system, first and second fixed transmitting stations each radiating a position indicating signal with said position indicating signals differing from each other in frequency but falling within a first frequency channel, a reference transmitting station radiating a carrier wave having a frequency distinguishable from said first frequency channel, means for generating a tone switching signal at said reference station, switch means for modulating said tone switching signal upon said carrier wave during spaced apart intervals, means at each of said fixed transmitting stations for receiving said carrier wave and detecting said tone switching signal, means at each of said fixed transmitting stations responsive to the detected tone switching signal for rendering each of the latter stations ineffective to radiate its position indicating signal and for rendering each such station effective to radiate an ambiguity resolution signal, said ambiguity resolution signals differing in frequency from each other but lying within a second frequency channel which is distinguishable from the first frequency channel and from the frequency of said carrier wave, receiving means at the reference station for receiving both the ambiguity resolution signals and the position indicating signals radiated from both of the fixed stations, said receiving means being effective to heterodyne said ambiguity resolution signals during each of said intervals in order to develop a first difference signal, said receiving means also being effective between said intervals to heterodyne the position indicating signals to develop a second difference signal, and means for modulating said carrier wave with reference signals respectively derived from said first and second difference signals.

19. In a transmitting system for use in a two foci hyperbolic, continuous wave, position finding system, first and second fixed transmitting stations each radiating a position indicating signal with said position indicating signals differing from each other in frequency but falling within a first frequency channel, a reference transmitting station radiating a carrier wave having a frequency distinguishable from said first frequency channel, means for generating a tone switching signal at said reference station, switch means for modulating said tone switching signal upon said carrier wave during spaced apart intervals, means at each of said fixed transmitting stations for receiving said carrier wave and detecting said tone switching signal, and means at each of said fixed transmitting stations responsive to the detected tone switching signal for rendering each of the latter stations ineffective to radiate its position indicating signal and for rendering each such station effective to radiate an ambiguity resolution signal, said ambiguity resolution signals differing in frequency from each other but lying within a second frequency channel which is distinguishable from the first frequency channel and from the frequency of said carrier wave, the frequency difference between the ambiguity resolution signals, radiated from the first and second stations being equal to the frequency difference between the position indicating signals radiated from the first and second stations.

20. In a transmitting system for use in a two foci hyperbolic, continuous wave, position finding system, first and second fixed transmitting stations each radiating a position indicating signal with said position indicating signals differing from each other in frequency but falling within a first frequency channel, a reference transmitting station radiating a carrier wave having a frequency distinguishable from said first frequency channel, means for generating a tone switching signal at said reference station, switch means for modulating said tone switching signal upon said carrier wave during spaced apart intervals, means at each of said fixed transmitting stations for receiving said carrier wave and detecting said tone switching signal, means at each of said fixed transmitting stations responsive to the detected tone switching signal for rendering each of the latter stations ineffective to radiate its position indicating signal and for rendering each such station effective to radiate an ambiguity resolution signal, said ambiguity resolution signals differing in frequency from each other but lying within a second frequency channel which is distinguishable from the first frequency channel and from the frequency of said carrier wave, the frequency difference between the ambiguity resolution signals radiated from the first and second stations being equal to the frequency difference between the position indicating signals radiated from the first and second stations, receiving means at the reference station for receiving both the ambiguity resolution signals and the position indicating signals radiated from both of the fixed stations, said receiving means being effective to heterodyne said ambiguity resolution signals during each of said intervals in order to develop a first difference signal, said receiving means also being effective between said intervals to heterodyne the position indicating signals to develop a second difference signal, and means for modulating said carrier wave with reference signals respectively derived from said first and second difference signals.

No references cited.